United States Patent [19]
Suzuki et al.

[11] Patent Number: 5,872,661
[45] Date of Patent: Feb. 16, 1999

[54] AUTOMATIC FOCUSING APPARATUS FOR A TELEPHOTOGRAPHIC SYSTEM

[75] Inventors: Shinichi Suzuki; Masahiro Nakata, both of Tokyo, Japan

[73] Assignee: Asahi Kogaku Kogyo Kabushiki Kaisha, Tokyo, Japan

[21] Appl. No.: 806,216

[22] Filed: Feb. 26, 1997

[30] Foreign Application Priority Data

| Feb. 28, 1996 | [JP] | Japan | 8-041794 |
| Mar. 14, 1996 | [JP] | Japan | 8-057880 |
| Mar. 15, 1996 | [JP] | Japan | 8-059833 |

[51] Int. Cl.⁶ ............... G02B 15/14
[52] U.S. Cl. ............ 359/698; 359/823; 396/85; 396/104; 396/137; 356/139.06; 250/203.2
[58] Field of Search ......... 359/823, 824, 359/694, 697, 698; 396/85, 88, 104, 137; 356/139.06, 139.07; 250/203.2, 201.2, 201.3, 201.4

[56] References Cited

U.S. PATENT DOCUMENTS

| 4,893,145 | 1/1990 | Matsuda | 396/137 |
| 5,144,491 | 9/1992 | Ushiro et al. | 359/698 |
| 5,216,480 | 6/1993 | Kaneko et al. | 356/139.06 |
| 5,266,982 | 11/1993 | Soshi | 396/104 |
| 5,438,190 | 8/1995 | Kaneda et al. | 250/201.3 |
| 5,715,101 | 2/1998 | Nakamura et al. | 359/823 |

*Primary Examiner*—Loha Ben
*Attorney, Agent, or Firm*—Greenblum & Bernstein, P.L.C.

[57] ABSTRACT

An automatic focusing apparatus for a telephotographic system includes a telephotographic system which moves a focusing lens along an optical axis to control the focus, a focus detector which detects the focus state through the telephotographic system, a lens moving device which moves the focusing lens, a controller which drives the lens moving device in accordance with the focus state detected by the detector to move the focusing lens to thereby control the focus, and an external operation device which actuates the controller to perform the focusing operation. The controller continues the focusing operation until the focusing operation is completed when the external operation device is actuated.

34 Claims, 13 Drawing Sheets

AUTOMATIC FOCUSING APPARATUS FOR A TELEPHOTOGRAPHIC SYSTEM

BACKGROUND OF THE INVENTION

1. Field of the Invention

The present invention relates to an automatic focusing apparatus which can be applied to an auto-level or a transit instrument etc., having a telephotographic system.

2. Description of the Related Art

A surveying instrument having a telephotographic system is basically provided with a collimating telescope.

In general, a surveying instrument is provided with a focusing apparatus which enables an operator to view a clear object image regardless of the distance of the object being viewed (aiming object). That is, it is necessary for an operator to actuate the focusing apparatus, while observing the aiming object through the collimating telescope, to view the object in a clear state. Consequently, a conventional auto-level suffers from the defects that the operator cannot concentrate upon the collimation operation due to the focusing operation, and that it takes a long time to complete the focusing operation. Due to these circumstances, an automatic focusing apparatus has been needed. However, if focusing cannot be carried out using the automatic focusing apparatus, or if the operator wants to manually control the focus, a manual focusing operation is further required.

In particular, in a surveying instrument which is often used outdoors, a dry battery (primary battery) or a rechargeable battery (secondary battery), etc., having a limited capacity is used as a power source for the automatic focusing apparatus. Consequently, the operation time of the automatic focusing apparatus is limited due to the limited capacity of the battery. There is a need to increase the operation time.

SUMMARY OF THE INVENTION

It is an object of the present invention to provide an automatic focusing apparatus of high operability for a telephotographic system, in which the focusing operation can be easily carried out.

Another object of the present invention is to provide an automatic focusing apparatus for a telephotographic system in which the focusing operation can be effected manually or automatically, and in which the manual focusing mode and the automatic focusing mode can be easily changed.

Still another object of the present invention is to provide an automatic focusing apparatus for a telephotographic system in which power consumption can be reduced to increase the operation time.

To achieve the object mentioned above, according to the present invention, there is provided an automatic focusing apparatus for a telephotographic system having a telephotographic system which moves a focusing lens along an optical axis to control focus. A focus detecting device detects the focus state through the telephotographic system. A lens moving device is provided for moving the focusing lens. A control device drives the lens moving device in accordance with the focus state detected by the detecting device to move the focusing lens to thereby control the focus. An external operation initiator actuates the control device to perform the focusing operation. The control device continues the focusing operation until the focusing operation is completed when the external operation device is actuated.

With this arrangement, since the optical system can be automatically focused merely by actuating the operation device by the operator, the operator can concentrate on an operation other than the focusing operation.

The focus detecting device can consist of a defocus detecting device for detecting a defocus with respect to a predetermined focal plane of the telephotographic system. The control device performs a search operation in which when no effective defocus can be detected by the focus detecting device, the defocus is detected while moving the focusing lens in the entire displacement range thereof, and when an effective defocus is detected, the focusing lens is moved to a focal position in which the focused state is obtained and detected. If no effective defocus can be detected by the focus detecting device, the defocus is detected while moving the focusing lens in the entire displacement range thereof, and when no effective defocus can be still detected even by the movement of the focusing lens in the entire displacement range, the focusing operation is stopped. The search operation makes it possible to focus on even an extremely unclear object which cannot be viewed by an operator's eyes, thus resulting in a difficulty with the manual focusing.

Preferably, once the automatic focusing operation begins in response to the operation of the external operation device, the control device continues the focusing operation regardless of the subsequent operation of the external operation device until the focused state is detected by the focus detecting device when the effective defocus is detected by the focus detecting device or until the search operation is completed when no effective defocus can be detected by the focus detecting device. With this arrangement, a focused state can be obtained in a wider range.

The external operation device can be made of a switch device. The control device commences the focusing operation when the switch device is turned ON, and the focusing operation continues even when the switch device is turned OFF. This enhances operability.

Alternatively, the control device can commence the focusing operation that has not been effected or stops the focusing operation that has been carried out every time the switch device is turned ON from OFF.

Provision can be made for a mode selection device for selecting a first mode in which the control device commences the focusing operation when the operation device is actuated and the focusing operation continues if the operation device is turned OFF, or a second mode in which the control device performs the focusing operation that has been not effected or stops the focusing operation that has been carried out every time the operation device is actuated. The mode selection is convenient for the operator.

According to another aspect of the present invention, there is provided an automatic focusing apparatus for a telephotographic system having a telephotographic system which moves a focusing lens along an optical axis to control a focus operation. A focus detecting device detects the focus state through the telephotographic system. A lens moving device moves the focusing lens. A control device drives the lens moving device in accordance with the focus state detected by the detecting device to move the focusing lens to thereby control the focus operation. An external operation device actuates the control device to perform the focusing operation. An electrical power source is also provided. The control device supplies power to the focusing device and the lens moving device from the power source to perform the focusing operation when the external operation device is actuated, and stops the power supply when the focusing operation ends.

With this arrangement, since the power is supplied to the focusing device and the lens moving device upon the commencement of the focusing operation, and the power supply is interrupted when the focusing operation ends, it is possible to reduce the electric power consumption.

The external operation device can be made of a switch, wherein the control device supplies the electrical power and performs the focusing operation when the switch is turned ON, and stops the power supply when the focusing operation is completed even if the switch is maintained in the ON state. Consequently, even if the switch is kept ON for some reason, once the focusing operation is completed, the power supply is interrupted, thus resulting in an avoidance of electric power wastage.

According to another aspect of the present invention, there is provided an automatic focusing apparatus for a telephotographic system having a telephotographic system which moves a focusing lens along an optical axis to control a focus operation. A focus detecting device detects the focus state through the telephotographic system. A lens moving device moves the focusing lens. A motor drive device drives the lens moving device. A clutch device is provided for selectively connecting the motor drive device and the lens moving device. A control device drives the focus detecting device and the motor drive device to control the focus. The control device connects the clutch device when the automatic focusing operation is carried out and disconnects the clutch device when no automatic focusing operation is effected.

With this structure, since the lens moving device is disconnected from the motor drive device by the clutch device while no focusing operation is carried out, it is possible to move the lens moving device manually.

Preferably, a manual drive device is provided for driving the lens moving device by an external operation force. The control device disconnects the clutch device so as not to transmit the operation force of the manual drive device to the motor drive device when the automatic focusing operation is not carried out.

Preferably, provision is made for an automatic focus start operation device. In this connection, the control device connects the clutch device to perform the automatic focusing operation when the automatic focus start operation device is actuated. Thus, when the automatic focus start operation device is actuated, the automatic focusing operation can be executed without switching the manual focus mode or the automatic focus mode. Moreover, when no automatic focusing operation is carried out, the manual focusing can be effected.

According to still another aspect of the present invention, there is provided an automatic focusing apparatus for a telephotographic system having a telephotographic system which moves a focusing lens along an optical axis to control a focus operation. A focus detecting device detects the focus state through the telephotographic system. A lens moving device moves the focusing lens. A manual drive device drives the lens moving device by an external operation force. A motor drive device drives the lens moving device. A clutch device is provided for selectively connecting the motor drive device and the lens moving device. A control device drives the focus detecting device and the motor drive device to control the focus. The control device normally disconnects the clutch device and connects the clutch device when the automatic focusing operation is carried out, the control device being adapted to disconnect the clutch device when the focusing lens is moved to the focal position, the clutch device being adapted to disconnect the clutch device after the focusing lens is moved to a predetermined position when the focusing lens cannot be moved to the focal position.

In this embodiment, if no focused state can be obtained by the automatic focusing operation, the clutch is disconnected after the focusing lens is moved to a predetermined position. Consequently, the subsequent manual operations can be facilitated. The predetermined position of the focusing lens can be a position corresponding to the object distance which is most frequently used or a position corresponding to an optional focal position predetermined by the operator.

The present disclosure relates to subject matter contained in Japanese Patent Application Nos. 08-41794 (filed on Feb. 28, 1996), 08-57880 (filed on Mar. 14, 1996) and 08-59833 (filed on Mar. 15, 1996) which are expressly incorporated herein by reference in their entireties.

BRIEF DESCRIPTION OF THE DRAWINGS

The invention will be described below in detail with reference to the accompanying drawings, in which.

DESCRIPTION OF THE PREFERRED EMBODIMENTS

Figure 1:
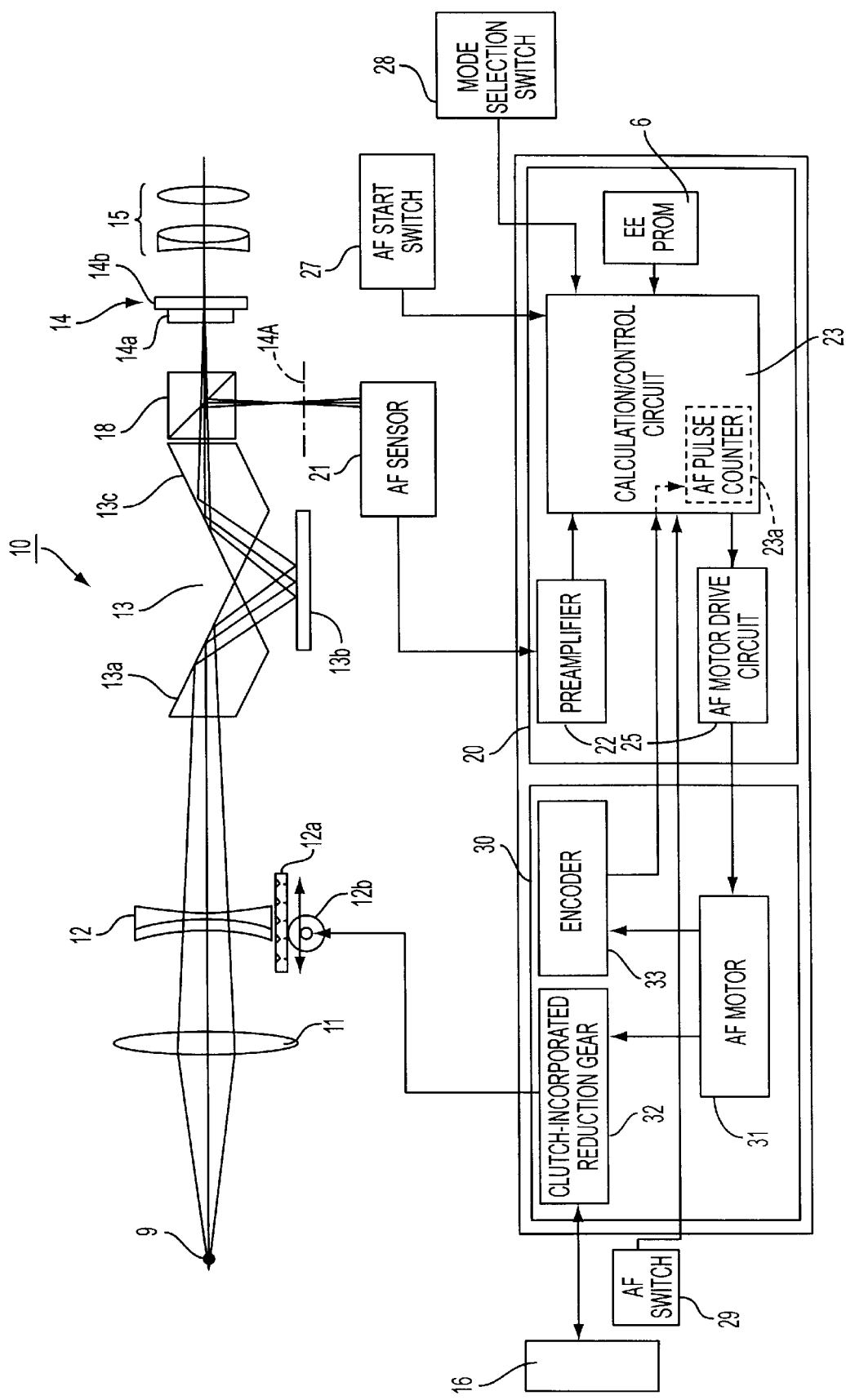
FIG. 1 is a block diagram of main elements of a first embodiment of an auto-level to which the present invention is applied.

FIG. 1 shows an automatic focusing apparatus according to a first embodiment of the present invention. An auto-level 10 includes a collimating objective lens 11 of positive power, a focusing lens 12 of negative power, an optical horizontal compensation system 13, a focusing plate 14

(which defines a focal plane 14 including a first focusing plate element 14a and a second focusing plate element 14b) and a positive eyepiece 15, in this order from an object side (the left side of FIG. 1).

The optical horizontal compensation system 13 (which is per se known) has a symmetrical shape and includes a first compensation prism 13a, a compensation mirror 13b, and a second compensation prism 13c. The optical horizontal compensation system 13 is hung from a shaft by a string (not shown). The angle defined between the compensation mirror 13b and the first compensation prism 13a is identical (in absolute-value) to the angle defined between the compensation mirror 13b and the second compensation prism 13c, but opposite in direction. The angle, for example 30°, varies depending on the length of the string, etc. When the optical horizontal compensation system 13 is set so that the optical axes of the objective lens 11 and the focusing lens 12 are substantially parallel (inclined at, for example, about 10 to 15 minutes with respect to the horizontal axis), light incident upon the first compensation prism 13a is deviated from the horizontal direction by the same amount, but the light reflected by and emitted from the first compensation prism 13a, the compensation mirror 13b and the second compensation mirror 13c is substantially collimated.

The focusing lens 12 is provided with a rack 12a secured thereto, which is engaged by a pinion 12b. When a rotation of the pinion 12b moves the focusing lens 12 in the optical axis direction, the image of an object 9 formed by the objective lens 11 and the focusing lens 12 is translated along the optical axis. The operator views the object image formed on the focusing plate 14 together with the collimation line drawn on the focusing plate 14, etc., through the eyepiece 15.

A beam splitter (half mirror) 18 is provided in the light path between the objective lens 11 and the focusing plate 14 to split the light (or light path). A focus detecting system (focus detector) 20 is provided in the split light path to detect the focus state (state of the formed image) at a surface 14A optically equivalent (positionally) to the focusing plate 14. The focusing lens 12 is driven by a lens driver 30 in accordance with the output of the focus detector 20.

The focus detector 20 includes an AF sensor 21 located in the vicinity of the equivalent surface 14A, so that the focus state, (i.e., a focused position, a non-focused position, front focus, rear focus, or defocus) can be detected in accordance with the output of the AF sensor 21. The internal structure of the focus detector 20 is well known. In the illustrated embodiment, a phase difference type AF sensor 21 is used in which the object image on the equivalent surface 14A is split by a condenser lens and a pair of separator lenses (image forming lenses) spaced at a distance identical to the base length. The object image is then re-formed on a pair of CCD line sensors. The CCD line sensors are each provided with a number of photoelectric transducers which convert the object image received thereby into electric charges which are integrated (accumulated). The integrated charges are output as AF sensor data which is amplified by a reamplifier 22 and is supplied to a calculation/control circuit 23. The calculation/control circuit 23 calculates the amount of defocus (defocus amount) in accordance with the AF sensor data. In the illustrated embodiment, in addition to the defocus amount, the displacement and direction of the movement of an AF motor 31 (the number of output pulses, referred to hereinafter as AF pulses of an encoder 33) necessary to move the focusing lens 12 until the defocus amount becomes zero is also calculated in accordance with the defocus amount.

The calculation/control circuit 23 drives the AF motor 31 through an AF motor drive circuit 25, in accordance with the rotation direction of the AF motor 31 and the number of AF pulses. The rotation of the AF motor 31 is transmitted to the pinion 12b through a clutch incorporating reduction gear 32 to move the focusing lens 12. The rotation of the AF motor 31 is detected by the encoder 33 whose output is counted by an AF pulse counter 23a of the calculation/control circuit 23. Thus, the driving or stopping is controlled in accordance with the counted value and the number of revolutions previously calculated.

The focus detector 20 and the focusing lens drive system 30 move the focusing lens 12 in the optical axis direction in accordance with the object distance to carry out the automatic focusing operation.

The focus detector 20 is provided with an AF start switch 27 which is actuated to start the automatic focusing operation, a mode selection switch 28 which is adapted to vary the focus state, and an AF switch 29 which detects the AF mode (that is, an AF mode which is not the manual focus mode). The AF start switch 27 may be considered an external operation initiator.

The pinion 12b is driven in either a manual focus mode in which the manual focusing operation using a manual focusing operation knob 16 is carried out, or in an autofocus mode in which the automatic focusing operation is carried out in accordance with the focus detector 20 and the focusing lens drive system 30. Namely, the auto-level 10 is constructed such that the mode is switched between the autofocus mode, in which the focusing lens 12 is driven in accordance with the output of the focusing detector 20, and the manual focus mode, in which the focusing lens 12 is driven manually regardless of the output of the focusing detector 20.

For instance, when the manual focusing operation knob 16, which constitutes a mode switching means, is moved in one direction along the optical axis, the manual mode is obtained, and when the manual focusing operation knob 16 is moved in the opposite direction along the optical axis, the autofocus mode (AF mode) is obtained. The calculation/control circuit 23 detects that the manual focusing operation knob 16 is switched to the autofocus mode when the AF switch 29 is turned ON.

The automatic focusing operation of the auto-level 10 is discussed below with reference to the flow charts shown in FIGS. 2 through 6. The automatic focusing operation is performed by the calculation/control circuit 23 when the battery (not shown) is loaded in the auto-level 10.

According to one of the features of the illustrated embodiment of the present invention, once the AF start switch 27 is turned ON, the automatic focusing operation continues even after the AF start switch 27 is turned OFF. Moreover, there are two selectable modes. Firstly, the present embodiment includes an AF continuation mode in which once the focusing operation is commenced in accordance with the mode selection, the focusing operation continues until the focusing operation is completed, i.e., until the focused state is obtained or the impossibility of the focusing operation is detected, even after the AF start switch 27 is turned ON or OFF. The present embodiment also includes second (stop) mode in which the focusing operation that has not been effected is carried out, or the focusing operation that has been effected is stopped every time the AF start switch is switched to ON from OFF. The selected mode is stored in an EEPROM 6 and is read out therefrom by the calculation/control circuit 23 upon the focusing operation. Although the mode selection is carried out by the operator's manual operation of the mode selection switch 28 in the illustrated embodiment, it is possible to preset the mode upon assembly so that the operator cannot select the mode.

Figure 2:
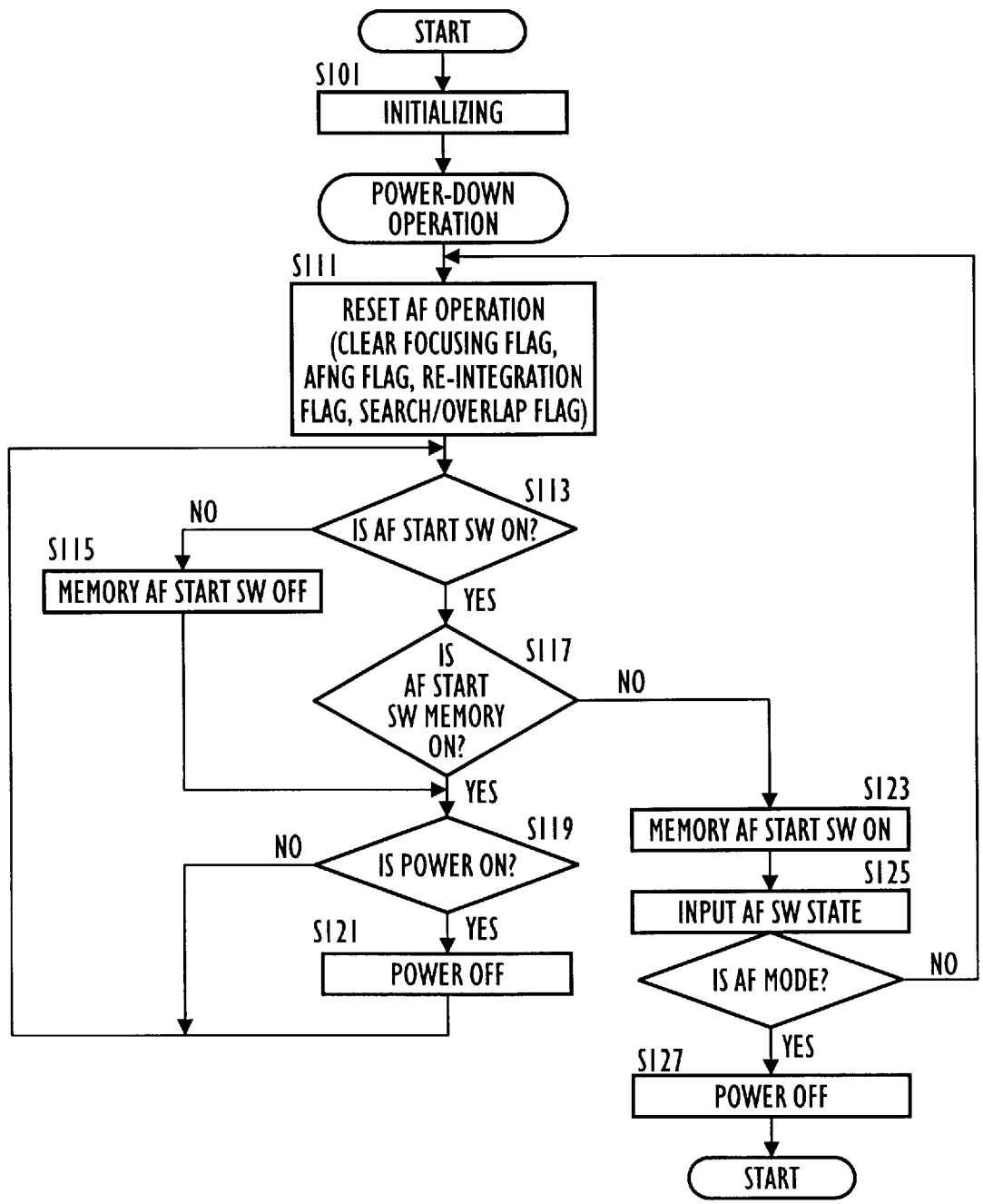
FIG. 2 is a flow chart of a start operation in a focusing operation of an auto-level according to the present invention.

As shown in FIG. 2, when the battery is loaded, the calculation/control circuit 23 initializes an internal RAM and input/output ports thereof, etc. at step S101 (in FIG. 2) and enters the power down operation. Thereafter, no operation at step S101 is performed so long as the battery is not reloaded.

The power-down operation corresponds to a stand-by operation in which the power source is OFF while the AF start switch 27 is OFF, i.e., waiting for the operation of the AF start switch 27. If the AF start switch 27 is turned ON, the power source is turned ON to perform the focusing operation.

In the power-down operation, a flag for the AF operation (focusing operation) is cleared (set to be zero), so that the operation ends (step S111). In the illustrated embodiment, there are several kinds of flags including a focusing flag which represents that the focused state is obtained, an AFNG flag which represents that the automatic focusing operation cannot be carried out, a re-integration flag which represents that the integration operation is performed after the focused state has been obtained, and a search/overlap flag which is adapted to discriminate that the integral operation is performed during the movement of the focusing lens 12.

If the set operation for the AF operation is completed, whether or not the AF start switch 27 is turned ON is checked (step S113). Since the AF start switch 27 is OFF at the initial position in which no operation by the operator occurs, the AF start switch memory (i.e., flag) is set to OFF (OFF data is written) at step S113, 115. Thereafter, whether or not the power source is ON is checked at step S19. Since the power source is OFF at the initial position in which no power is supplied to each circuit, the control is returned to step S113 and the operations at steps S113, 115 and 119 are repeated.

If the AF start switch 27 is turned ON, the following operation is performed. The control proceeds to step S117 from S113 to check whether the AF start switch memory is ON. If the AF start switch memory is OFF, (the memory is OFF at the first time), the control proceeds to step S123 to set the AF start switch memory to ON (write ON data) at step S123. Thereafter, whether the AF switch 29 is ON, which corresponds to the AF mode, is checked. If the AF switch 29 is turned ON, the power source is turned ON to supply power to the circuits in order to perform the VDD loop operation (steps S125, S127). If the AF switch 29 is OFF, which corresponds to the manual mode, the control is returned to the power-down operation (step S111) at step S125.

Figure 3:
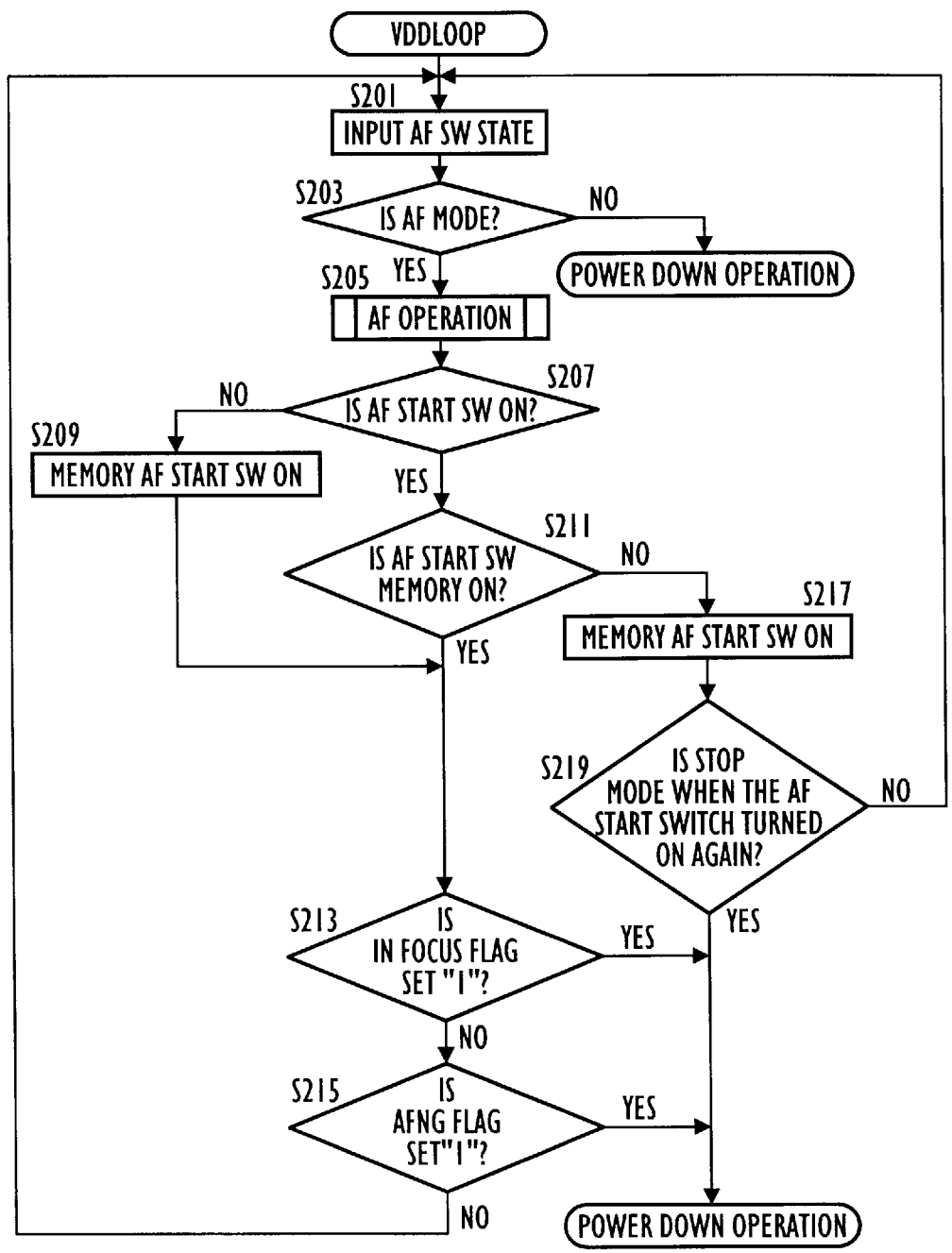
FIG. 3 is a flow chart of a VDD loop operation in a focusing operation of an auto-level according to the present invention.

As shown in FIG. 3 in the VDD loop operation, the focusing operation is carried out to obtain a focused state while detecting the state of the AF switch 29. If focusing is not possible, the control is returned to the power-down operation.

When the control enters the VDD loop operation, the state of the AF switch 29 is input again. If the AF switch 29 is OFF, which corresponds to the manual focus mode, the control is returned to the power-down operation (steps S201, S203). The following discussion will be given on the assumption that the AF switch 29 is ON.

If the AF switch 29 is ON, the AF operation is performed to detect the defocus amount and move the focusing lens 12 to a focal position in accordance with the defocus amount (step S205). During the AF operation, whether the AF start switch 27 is ON is periodically checked (step S207). If the AF start switch 27 is ON, whether or not the AF start switch memory is ON is checked. Since the latter has been turned ON at step S123, the focus flag and the AFNG flag are checked at steps S211, S213, S215. Since the focus flag and the AFNG flag are both cleared if no focused state nor the impossibility of the focusing operation are detected during the AF operation, the control is returned to step S201. The operations at steps S201, S203, S205, S207, S211, S213, and S215 are repeated until the focus flag is set "1" or the AFNG flag is set "1". If the AF start switch 27 is OFF, the control proceeds to step S209 from step S207 to set the AF start switch memory to OFF and is returned to step S201 from step S215.

Normally, the focusing lens 12 is moved to the focal position during the AF operation at step S205. Consequently, the focus flag is set to "1" and the control is returned to the power-down operation (step S213) to finish the AF operation. If focusing cannot be effected for some reason, for example, when the aiming object moves or is too dark or is too low in contrast, the AFNG flag is set to "1" to return the control to the power-down operation (S215), and thus the control ends (step S111).

If the AF start switch 27 is turned ON again after it has been turned OFF during the VDD loop operation, the control proceeds to step S211 from step S207. Since the AF start switch memory is OFF at the first step, the control proceeds to step S217 from step S211 to set the AF start switch memory to ON and check whether the mode is a stop mode when the AF start switch is turned ON again (step S219).

If the mode is not the stop mode at the re-operation of the AF start switch, once the AF start switch 27 is turned ON, the operation continues until the focus flag is set to "1" or the AFNG flag is set to "1", even if the AF start switch 27 is turned OFF or is thereafter turned ON again. If the mode is the stop mode, the focusing operation that has not been effected is performed or the focusing operation that has been effected is suspended every time the AF start switch 27 is turned ON. The logic of the mode check can be selected by the operator who actuates the mode switch 28. The selection result is stored in the EEPROM 6.

If the stop (second) mode is not selected at step S219, the control is returned to step S201. If the AF start switch 27 is turned ON, whether or not the AF start switch memory is ON is checked. If the AF start switch memory is ON, the focus flag and the AFNG flag are checked, and thereafter the control is returned to step S201 (steps S211, S213 and S215). If the AF start switch 27 is OFF at step S207, the control proceeds to step S209 to set the AF start switch memory to OFF. Thereafter, the focus flag and the AFNG flag are checked (steps S213, S215). Thereafter, the control is returned to step S201.

As can be seen from the foregoing, when the stop mode at the re-operation of the AF start switch is not selected, once the AF start switch 27 is set to ON, the focusing operation is repeated until the focused state is obtained or the impossibility of the focusing operation is detected. Thus, the operator can execute the survey operation without being bothered with the focusing operation.

If the AF start switch 27 is turned ON during the VDD loop operation, namely, if the manual focus operation knob 16 is moved to the manual focus position, the control is returned from step S203 to the power-down operation and then the AF operation ends.

When the control is returned to the power-down operation, the AF operation ends as mentioned above.

Normally, the AF start switch 27 is kept ON during the first power-down operation. Consequently, since the AF start switch 27, the AF start switch memory and the power source are all ON, the control proceeds from steps S111, S113, S117, S119 to step S121. The power supply is therefore stopped. The loop operation of steps S113, S117, S119 and S121 is repeated while the AF start switch 27 is ON. If the AF start switch 27 is turned OFF, the control proceeds to step S115 from step S113 to set the AF start switch memory to OFF. Thereafter, the control is returned to steps S119 and S113. This operation is repeated. If the AF start switch 27 is turned ON during the loop operation, the control proceeds from step S113 to steps S117 and S123 and enters the VDD loop operation through steps S125 and S127.

As may be understood from the above discussion, the switching operation is repeated. Namely, when the stop mode at the re-operation of the AF start switch 27 is selected, the focusing operation that has not been effected is carried out, or the focusing operation that has been effected is stopped every time the AF start switch 27 is turned OFF.

Figure 4:
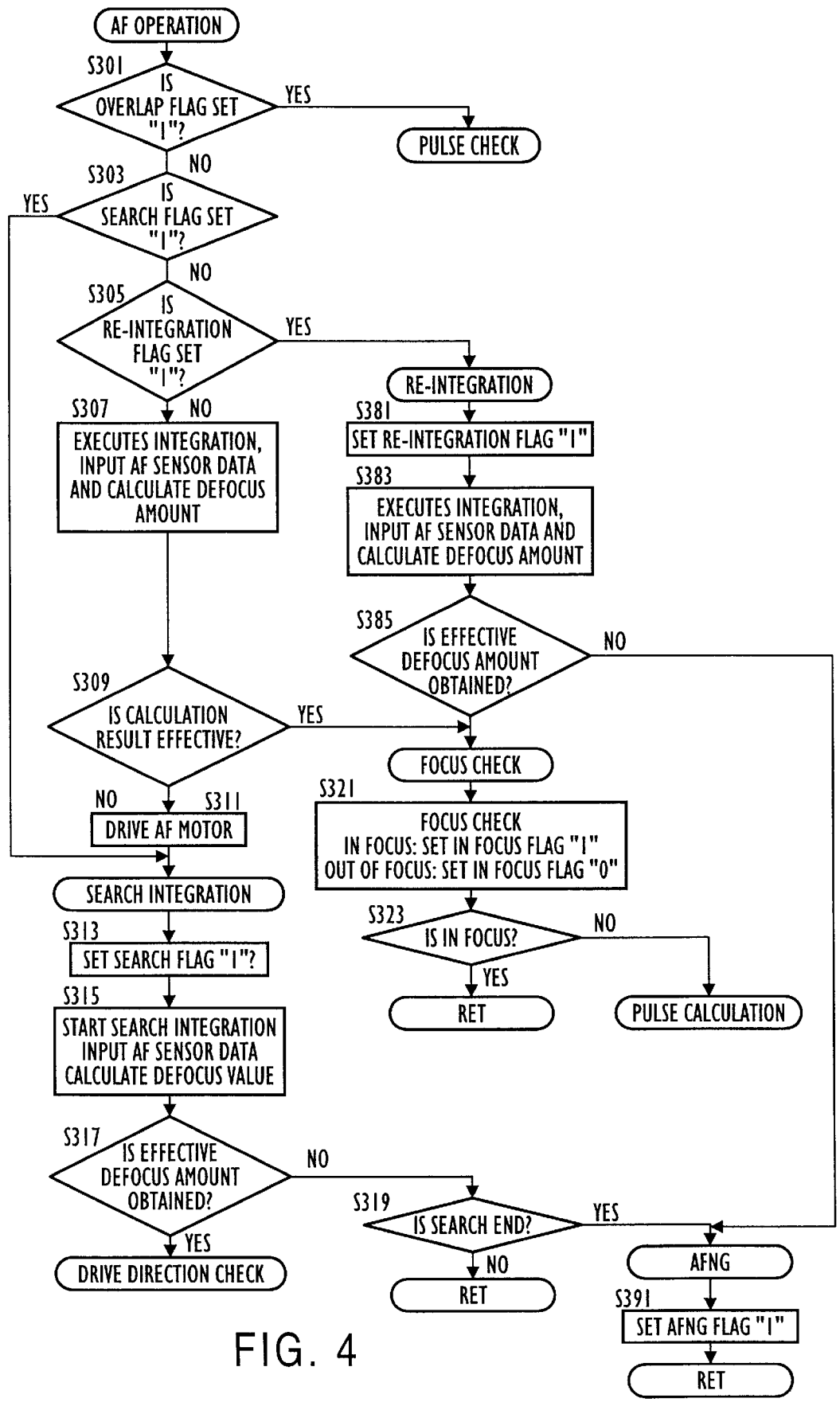
FIG. 4 is a flow chart of an AF operation in a focusing operation of an auto-level according to the present invention.

The AF operation will be described below in detail with reference to the flow charts shown in FIGS. 4 through 6. As shown in FIG. 4, when the control enters the AF operation, the overlap flag, the search flag and the re-integration flag are checked (steps S301, S303, S305). Since all the flags have been cleared at step S111 at the first step, the AF sensor executes the integration and the integration result is input as AF sensor data to calculate the defocus amount (step S307). As is well known, in the calculation of the defocus amount, a correlation ratio of the data of a pair of AF sensors is obtained, so that the direction of defocus (front focus or rear focus) and the defocus amount can be obtained in accordance with the correlation ratio.

Whether or not the calculation result is effective is checked at step S309. If the contrast of the aiming object is too low, or the aiming object is a repetitive pattern, or the object brightness is too low, there is a possibility that the calculation result is ineffective. Normally, an effective calculation result is obtained, and hence, the effective calculation result will be discussed below first.

If the calculation result is effective, the focus check operation is performed. If a focused state is obtained the focus flag is set to "1", and if the telescope is out-of-focus the focus flag is set to "0" (step S321). In the illustrated embodiment, when the defocus amount is within a predetermined limit or allowance, it is considered that a focused state is obtained.

If the focused state is obtained, the control is returned to the VDD loop operation to perform the operations at step S207 and steps subsequent thereto. In many cases, the telescope is out-of-focus in the initial position. In the case of an out-of-focus state, the control proceeds to the pulse calculation operation (step S323).

In the pulse calculation operation, the driving amount of the AF motor 31 (the number of AF pulses supplied from the encoder 33) necessary to move the focusing lens 12 until the defocus amount is zero is calculated.

Figure 5:
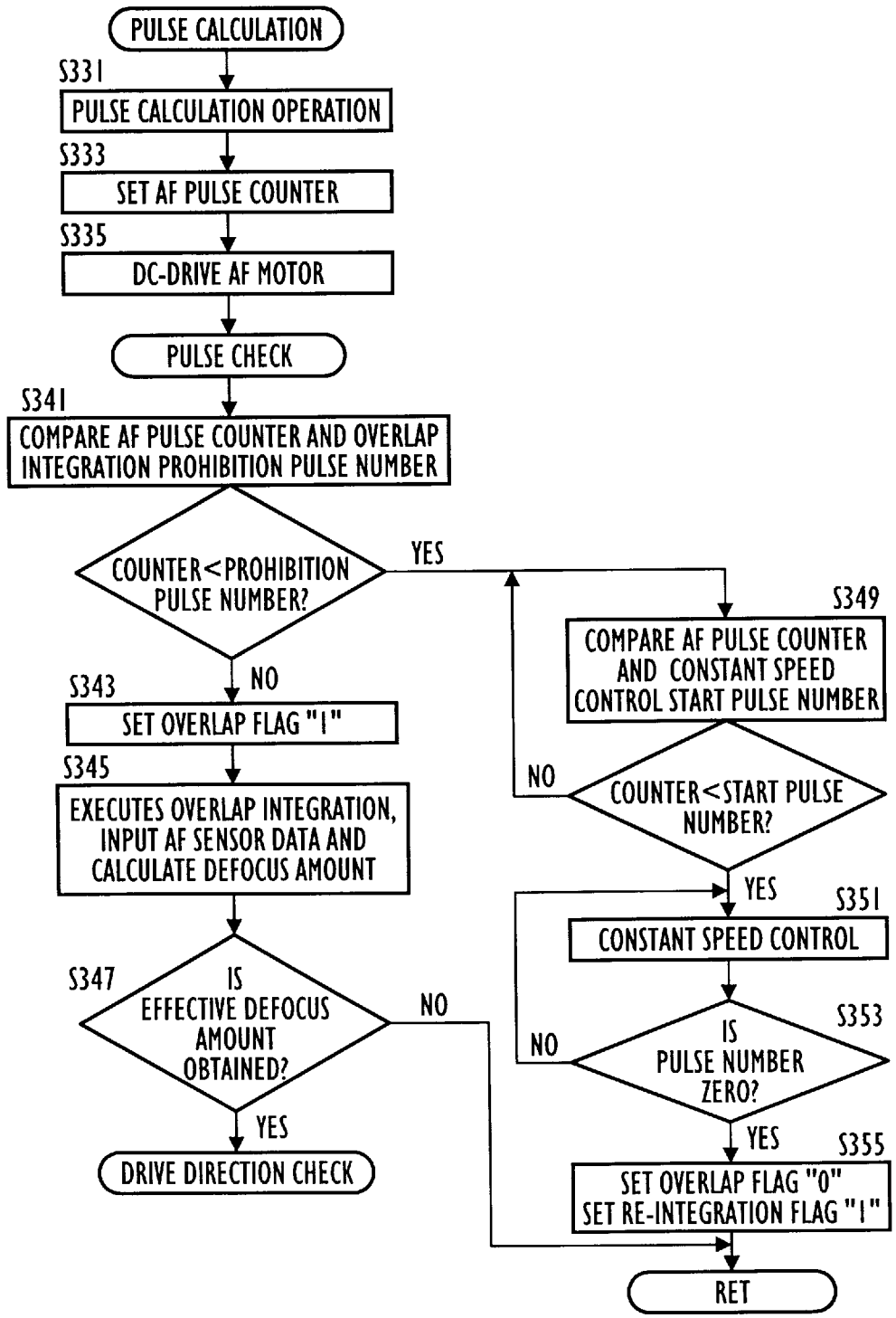
FIG. 5 is a flow chart of a pulse calculating operation in a focusing operation of an auto-level according to the present invention.

As shown in FIG. 5, in the pulse calculation operation, the drive direction of the AF motor 31 and the number of AF pulses are calculated in accordance with the defocus amount (step S331). The AF pulse number is set in the AF pulse counter 23, the AF motor 31 is DC-driven, and the pulse checking is carried out (steps S333, S335). The value of the AF pulse counter is decremented by one every time one AF pulse is output from the encoder 33.

In the pulse check operation, the drive speed of the AF motor 31 is controlled in accordance with the value of the AF pulse counter. Namely, when the counted number is larger than the overlap integration prohibition pulse number, the AF motor 31 is driven at high speed to move the focusing lens 12 toward the focal position within a short time and overlap integration is effected. When the counted number is smaller than the overlap integration prohibition pulse number, the AF motor 31 is driven at high speed, but overlap integration is prohibited. If the counted number is smaller than a (constant speed control) start pulse number, the AF motor 31 is PWM-driven (pulse width modulation) at low speed to prevent the focusing lens from moving to the hyperfocal distance of the telephotographic system. When the counted number is zero, the AF motor 31 is stopped.

When the control enters the pulse check operation, the value of the AF pulse counter is compared with the overlap integration prohibition pulse number (step S341). If the counter value is larger than the overlap integration prohibition pulse number, the control proceeds to step S343 in which the overlap flag is set to "1". Thereafter, the overlap integration begins, and the AF sensor data is input from the AF sensor 21 to perform the defocus amount calculation (step S345). If an effective calculation result is obtained, the control proceeds to the drive direction check operation, and if no effective calculation result is obtained, the control is returned (step S347).

Figure 6:
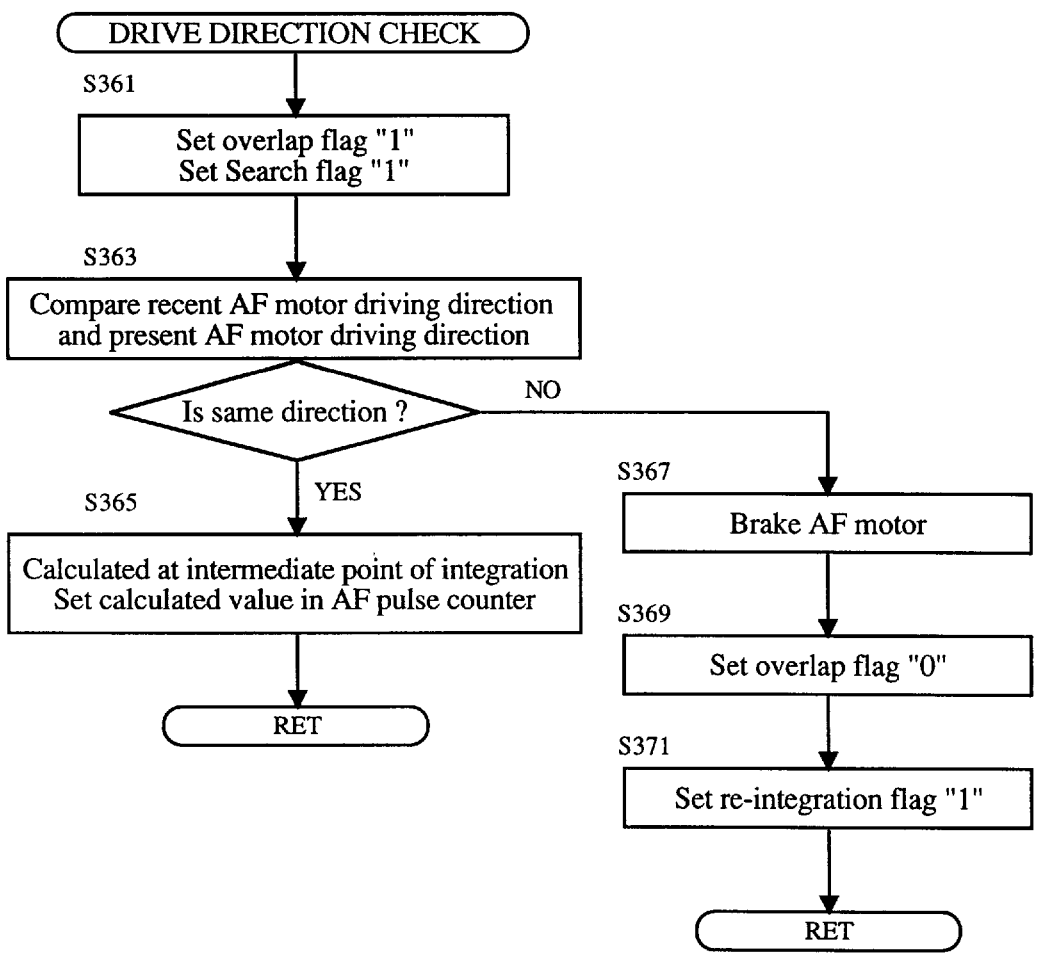
FIG. 6 is a flow chart of a drive direction checking operation in a focusing operation of an auto-level according to the present invention.

As shown in FIG. 6, in the drive direction check operation, the AF pulse number is calculated and set in the counter, based on the AF sensor data obtained by the integration during driving of the AF motor 31. If the drive direction changes, the AF motor 31 is braked and stopped. In the illustrated embodiment, the AF motor 31 is braked by a short-circuit of the AF motor 31 at the opposite electrodes thereof.

When the control enters the drive direction check operation, the overlap flag is set to "1", and the search flag is set to "0" (step S361). Thereafter, the previous and present drive directions of the focusing lens 12 are compared in accordance with the calculation result (step S363). Normally, the directions are identical, and hence, the AF pulse number is calculated at an intermediate point of the integration, so that the calculated value is set in the counter (steps S363, S365). Thus, the control is returned.

If the drive direction changes, the AF motor 31 is braked and stopped. Consequently, the overlap flag is set to "0" and the re-integration flag is set to "1". Thereafter, the control is returned to the VDD loop operation (steps S363, S367, S369, S371).

When the control is returned to the VDD loop operation, the operations at step S207 and steps subsequent thereto are carried out to enter the AF operation. If no change in the drive direction occurs, the control proceeds to the pulse check operation from step S301 since the overlap flag is set to "1". The operations from step S341 to S347 and the operations of the drive direction check operation from step S361 to S365 are carried out and the control is returned to step S205 for the pulse check operation. These operations are repeated until the counter value is smaller than the overlap integration prohibition pulse number.

In the above mentioned operations, the pulse number necessary to move the focusing lens to the focal position is decreased and becomes smaller than the overlap integration prohibition pulse number. Thus, the control proceeds from step S341 to S349 of the pulse check operation.

Returning to FIG. 5, the operations from step S349 to S355 are effected to stop the AF motor 31 upon completion of the driving of the AF motor corresponding to the calculated pulse number. At step S349, no control proceeds until the AF pulse number is smaller than the (constant speed control) start pulse number. If the AF pulse number is smaller than the (constant speed control) start pulse number, the AF motor 31 is driven at a low speed in accordance with the remaining pulse number. When the pulse number is zero, the AF motor 31 is stopped (step S349, S351, S353). When the AF motor 31 is stopped, the overlap flag is set to "0", and the re-integration flag is set to "1". Thereafter, the control is returned to the VDD loop operation (steps S353, S355).

If the control proceeds to step S205 of the VDD loop operation, the control then enters the re-integration operation at step S305, since the overlap flag and the search flag are set to "0" and the re-integration flag is set to "1". The same is true when the drive direction changes at step S363.

In the re-integration operation, the defocus amount is calculated, and whether or not the telescope is focused is checked in accordance with the defocus amount thus obtained. If the focused state is obtained, the focus flag is set to "1", and if the focused state is not obtained, the AF pulse is calculated again to move the focusing lens.

If the control is returned to the VDD loop operation when the focus flag is set to "1", the control proceeds to the power down operation from step S213. Thus, the AF operation ends and the control waits for the operation of the AF start switch 27.

The above discussion can be applied when the focused state is correctly obtained. In the case that it is difficult or impossible to obtain a focused state for some reason, the control enters the VDD loop operation and is returned to the power-down operation. This will be discussed below.

As shown in FIG. 4, in the first AF operation, the integration begins, the AF sensor data is input, and the defocus amount is calculated at step S307 (steps S301, S303, S305). If it is impossible to calculate the effective defocus amount for some reason, i.e., for example when the object contrast is too low, the control proceeds to the search integration operation from step S309.

In the search integration operation, the integration and the defocus calculation are carried out to obtain an effective defocus amount while driving the AF motor 31 from a close focal position to an infinite focal position. If no effective defocus amount is obtained even by the search integration operation, the AFNG flag is set to "1" and the control is returned and enters the power-down operation at step S215.

In the search integration operation, the AF motor 31 is search-driven (in the direction of the close focal position) and the search flag is set to "1" to commence the integration by the AF sensor 21. When the integration is completed, the integral value is input as the AF sensor data to calculate the defocus amount (steps S311, S313, S315). If the effective defocus amount is obtained, the control proceeds to step S317 to the drive direction checking operation. If no effective defocus amount is obtained, the control is returned to the VDD loop operation to perform the operations at step S205 and steps subsequent thereto (steps S317, S319).

The AF motor search-driving operation refers to an operation in which the AF motor 31 is first driven in the direction of the close focal position and when the focusing lens 12 reaches and stops at a movement extremity on the close distance side, the AF motor 31 is driven in the reverse direction, i.e., in the infinite focal position. When the focusing lens 12 reaches and stops at a movement extremity on the infinite object distance side, the AF motor 31 is stopped. If an effective calculation result is obtained during the search driving, the AF motor is driven in accordance with the effective value of the defocus amount.

When the control enters the operation at step S205 of the VDD loop operation, the overlap flag is cleared. Since the search flag is set to "1", the control enters the search integration operation at step S303 and the search integration operations at step S313 and steps subsequent thereto are carried out. If no effective calculation result is obtained when the focusing lens 12 reaches the infinite focal position, the control enters the AFNG operation, in which the AFNG flag is set to "1". Thereafter, the control is returned to the VDD loop operation and enters the power-down operation at step S215 (steps S317, S319, S391).

The above discussion has been directed to the case when no effective calculation result is obtained from the beginning. Once an effective calculation result is obtained, so that the focusing lens 12 is moved but no focused state is still obtained, if no effective calculation result is obtained by the re-integration operation (steps S381, S383), the control proceeds to the AFNG operation at step S385. The AFNG flag is set to "1" in the AFNG operation and thereafter, the control is returned to the VDD loop operation and enters the power-down operation at step S215 (S385, S391).

In the above-mentioned embodiment, the control directly proceeds to the power-down operation when the AFNG flag is set to "1" at step S215, i.e., the effective calculation result is not obtained or focusing is not possible.

In the case that a telephotographic system is used as a collimating telescope of a surveying instrument, such as a transit or a level, a standard staff having a width of approximately 50 mm to 70 mm may be used as a subject to be surveyed. If the staff is located at a distance of approximately 10 m, the difference between the width of the focus detecting area within the field of view of the collimating telescope and the width of the image of the staff is small. Consequently, in the automatic focusing operation, there is no detection error caused by the background when the distance is within approximately 10 m, but if the distance is longer than 10 m, the detection error tends to occur due to the background.

The deviation (displacement) of the image forming position is small within the distance range of 30 m to infinite. Consequently, if no focusing can be effected, the focusing lens 12 is moved to a predetermined position corresponding to an object located at a distance of, for example, 15 to 20 m (which is most frequently used). If the telescope is focused for this specific object, the image of the staff (located at the object distance of, e.g., 15 to 20 m) can be relatively clearly formed. Consequently, the operator can easily and certainly view the staff within the field of view of the telephotographic system. Thus, even if no automatic focusing operation can be effected, the drawbacks of a dim object image and a long operating time for an operator to visually perform the manual focusing operation can be eliminated.

Figure 7:
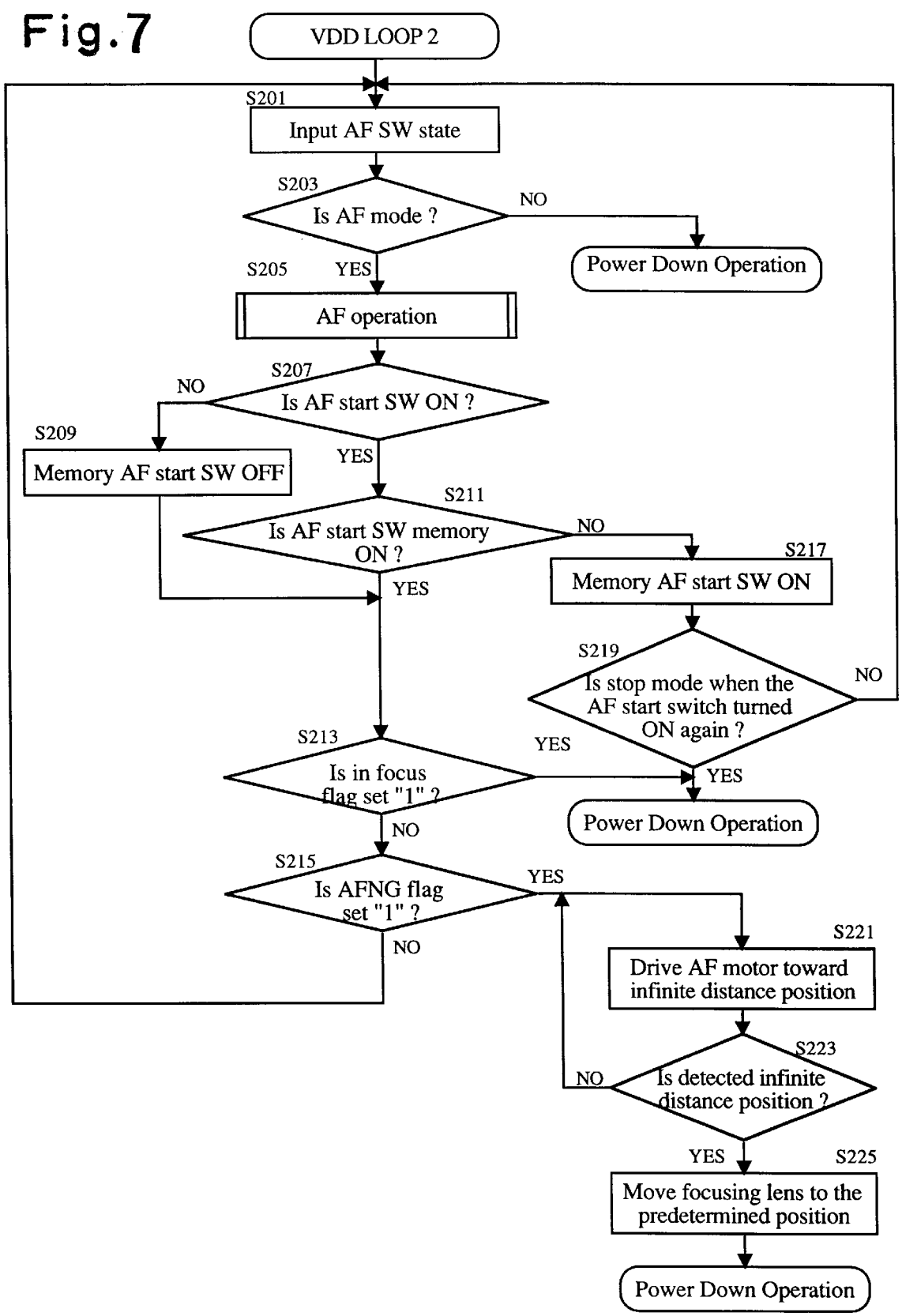
FIG. 7 is a flow chart of another VDD loop operation in a focusing operation of an auto-level according to the present invention.

FIG. 7 shows a flow chart for the operation mentioned above. The second VDD loop operation shown in FIG. 7 is a modification of the VDD loop operation shown in FIG. 3. In FIG. 7, the steps corresponding to those in FIG. 3 are designated with like numerals and no duplicate explanation thereof will be given.

The embodiment shown in FIG. 7 is characterized in that when the AFNG flag is set to "1" at step S215, i.e., when no effective calculation result is obtained or focusing can not be effected, the focusing lens 12 is moved to a predetermined position and thereafter, the control enters the power-down operation.

If the AFNG flag is set to "1" at step S215, the AF motor 31 is driven in the direction of the infinite focal position to move the focusing lens 12 toward the infinite distance position (step S221). When the movement of the focusing lens to the infinite object distance position is detected by a detecting means (not shown), the AF motor 31 is driven in the direction of the close focal position to move the focusing lens to a predetermined position, e.g., the hyperfocal distance. Thereafter, the control enters the power-down operation (steps S223, S225). The amount of drive of the AF motor 31 from the infinite extremity to the predetermined position is determined in accordance with the number of AF pulses detected by the encoder 33.

In the embodiment shown in FIG. 7, the focusing lens 12 is firstly moved to the infinite extremity. Alternatively, it is possible to move the focusing lens to the closest extremity. If the position of the focusing lens 12 is known (i.e., detected), it is also possible to move the focusing lens to a predetermined position directly from the known position.

Figure 8:
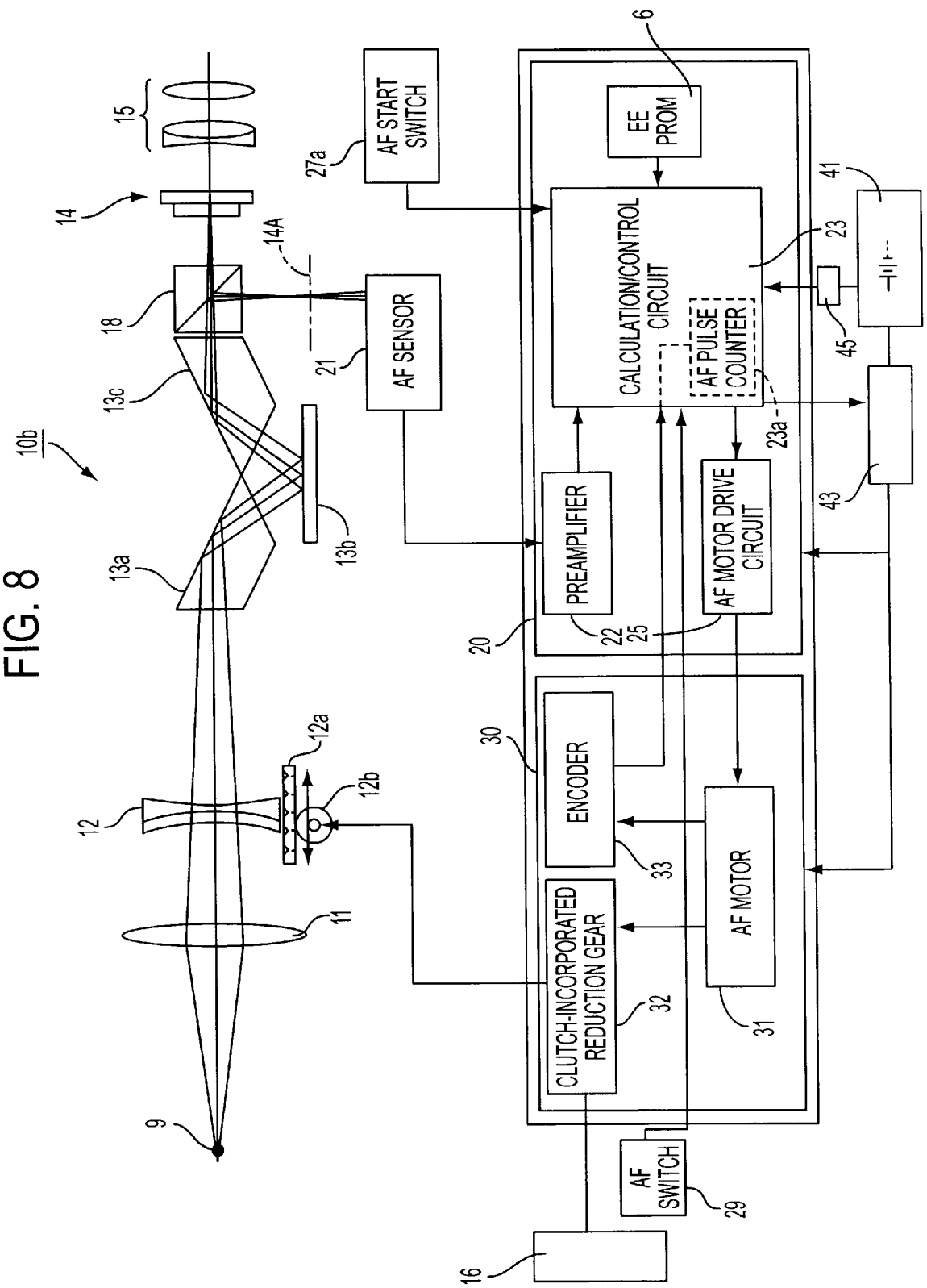
FIG. 8 is a block diagram of main elements of a second embodiment of an auto-level to which the present invention is applied.

FIG. 8 shows a second embodiment of the present invention applied to an auto-level 10a. The elements corresponding to those of the auto-level 10 shown in FIG. 1 are designated with like reference numerals and no explanation thereof will be given hereinafter.

The auto-level 10a is provided with a battery 41 which is used to drive the focus detector 20 and the focusing lens drive system 30. The power of the battery 41 is supplied to each circuit through a DC/DC converter 43. Furthermore, the battery power is always supplied to the calculation/control circuit 23 through a regulator 45. The calculation/control circuit 23 controls the ON/OFF operation of the DC/DC converter 43 to thereby control the power supply of the battery 41 to other circuits.

The AF start switch 27a is a (momentary ON) push button switch which is turned ON when it is depressed by the operator and is automatically turned OFF when the external force is removed. The auto-level 10a has no mode switch 28. Namely, the auto-level 10a performs the AF operation when the AF start switch 27a is turned ON and stops the AF operation to thereby stop the power supply from the battery 41 when the AF start switch 27a is turned OFF, respectively.

The auto-level 10a operates in accordance with the flow charts shown in FIGS. 2 through 7.

The power of the battery 41 is normally supplied only to the calculation/control circuit 23, but is not supplied to the focus detector 20 and the focusing lens drive system 30. When the AF start switch 27 is turned ON, the power of the battery 41 is supplied to the focus detector 20 and the focusing lens drive system 30 to perform the focusing operation. When the focused state is obtained or no focused state can be obtained, the power supply to the focus detector 20 and the focusing lens drive system 30 is interrupted to avoid the waste of battery power. Moreover, if the AF start switch 27a is kept ON for some reason, the power supply to the circuits other than the calculation/control circuit 23 is stopped to avoid the waste of battery power.

Figure 9:
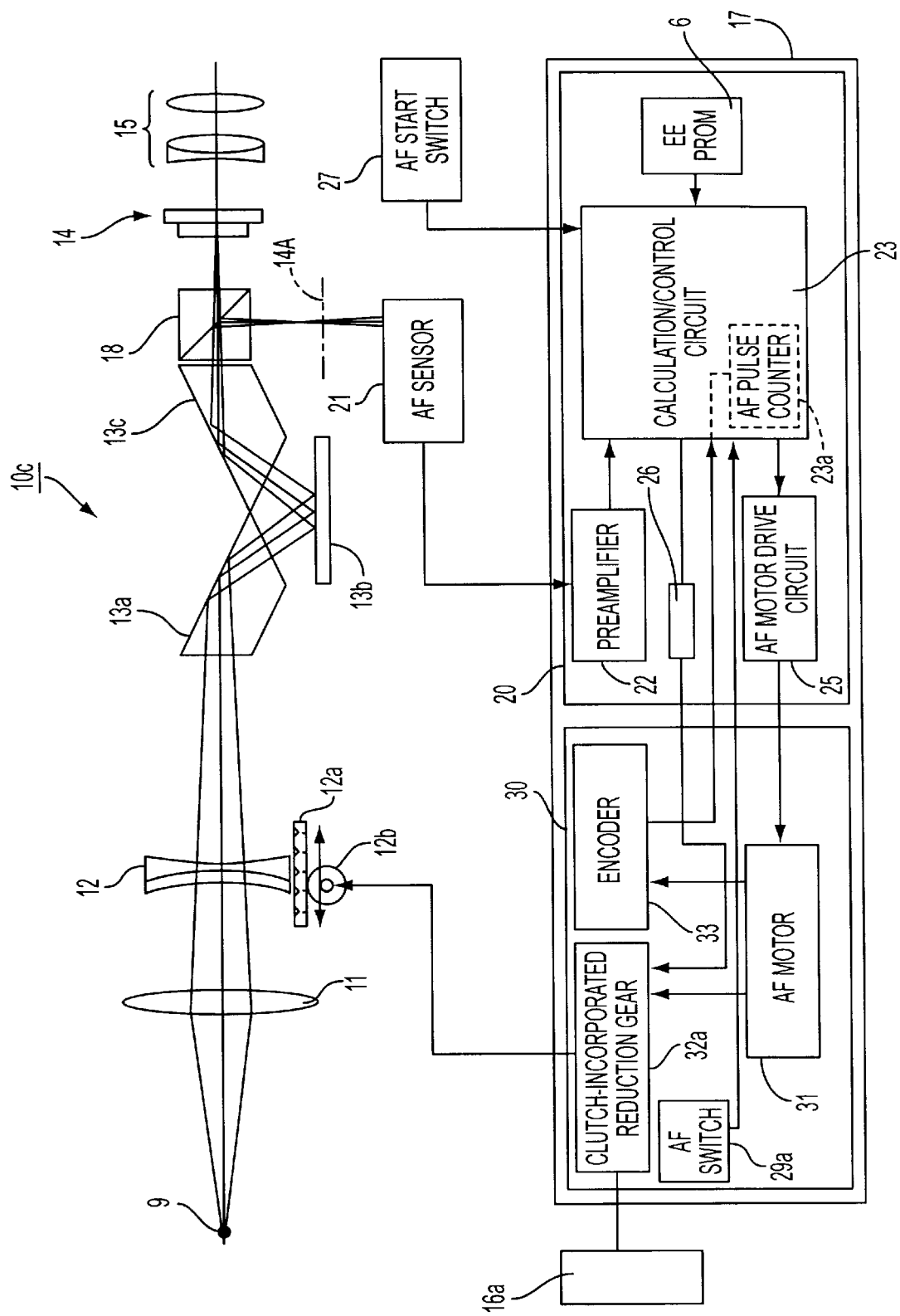
FIG. 9 is a block diagram of main elements of a third embodiment of an auto-level to which the present invention is applied.
Figure 10:
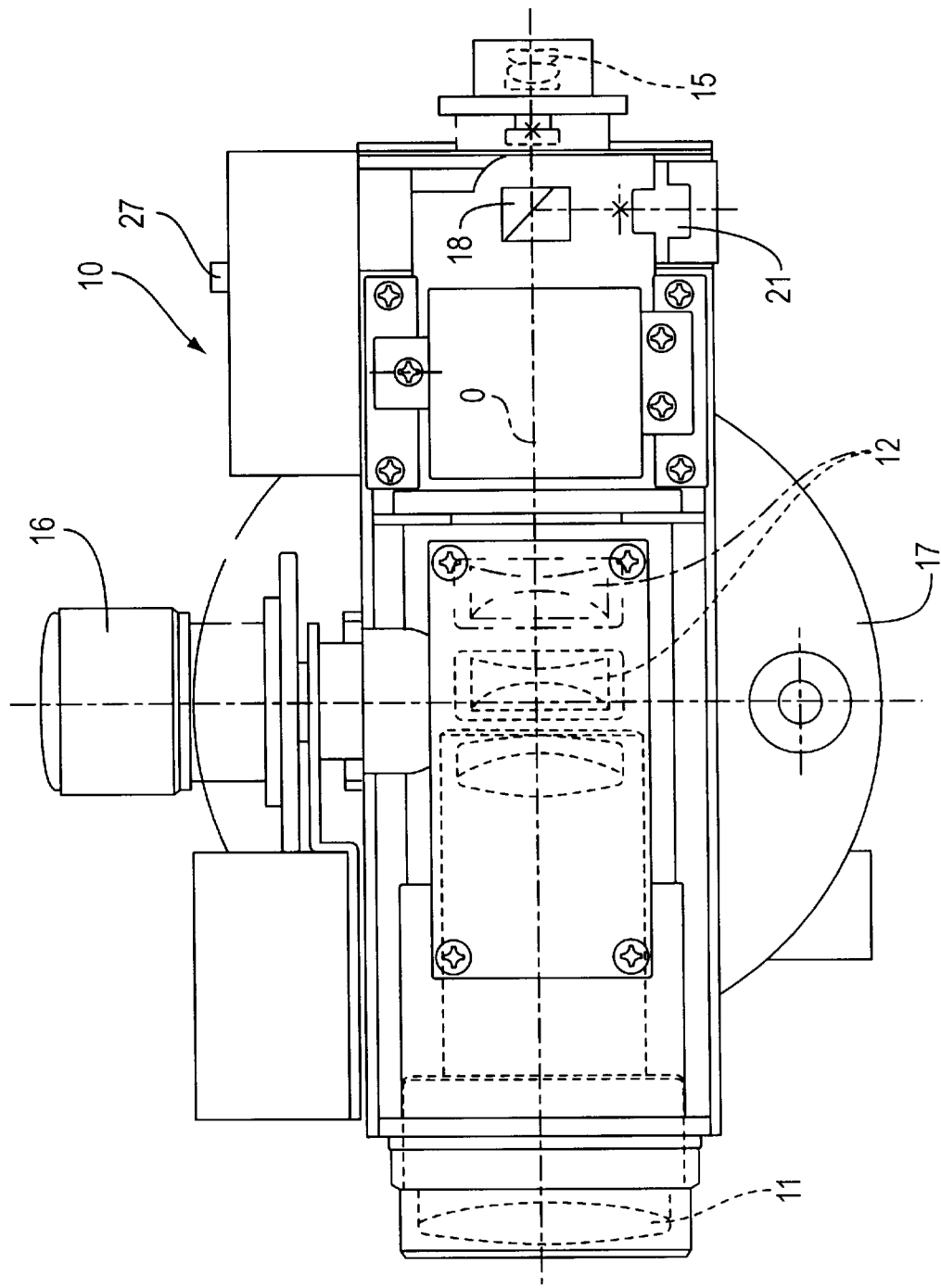
FIG. 10 is a plan view of the auto-level shown in FIG. 9.

FIG. 9 shows a third embodiment of an auto-level 10c according to the present invention, applied to a clutch-incorporating reduction gear 32a having an electromagnetic clutch. The elements corresponding to those of the auto-level 10 shown in FIG. 1 are designated with like reference numerals and no explanation thereof will be given.

Figure 11:
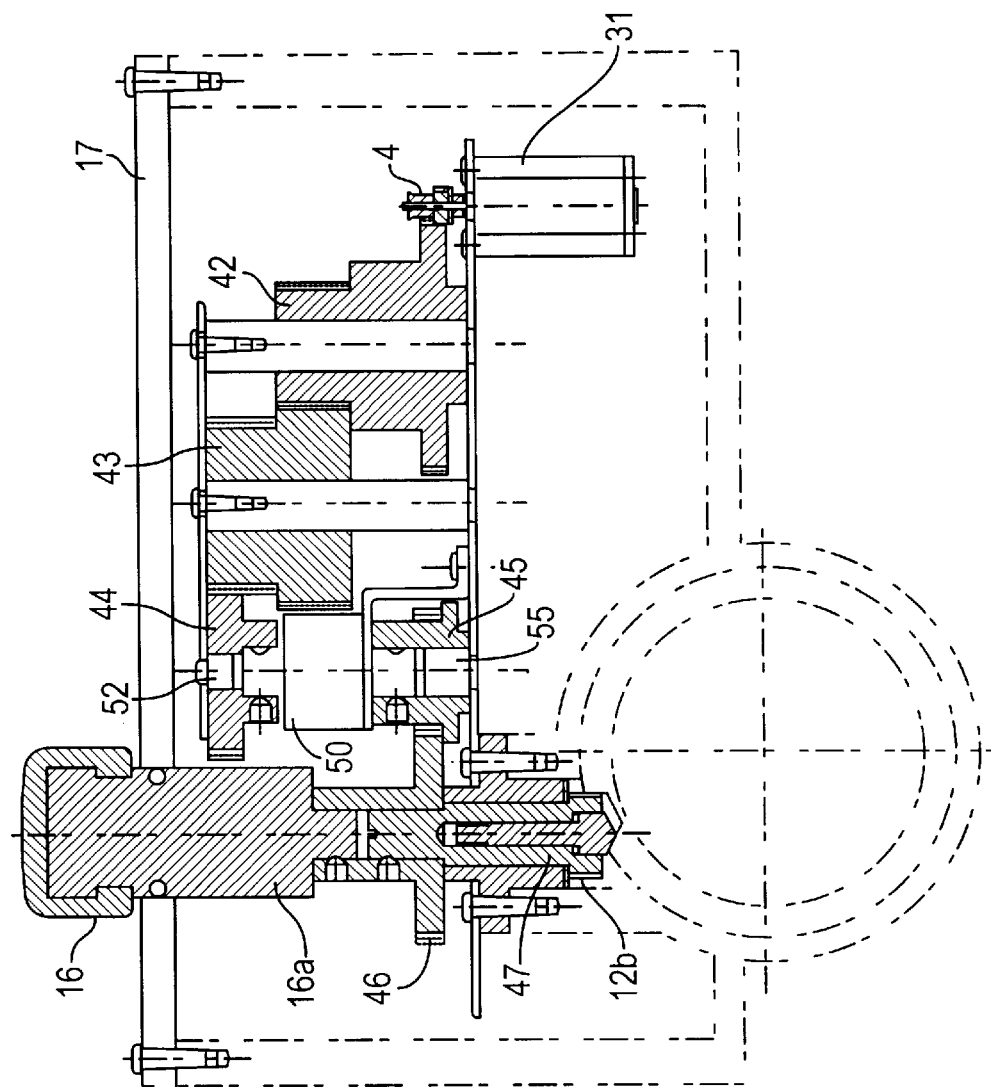
FIG. 11 is a sectional view of peripheral components of a focusing apparatus in the auto-level shown in FIG. 9.

The reduction gear 32a includes an electromagnetic clutch 50 (FIG. 11) incorporated therein to transmit the rotation of the AF motor 31 to the pinion 12b. The electromagnetic clutch 50 is supplied with power and is controlled by the calculation/control circuit 23 through an electromagnetic clutch drive circuit 26.

The pinion 12b is driven either in a manual focus mode using the focus operation knob 16, or in an autofocus mode using the focus detector 20 and the focusing lens drive system 30. That is, the auto-level 10 is switched between the autofocus mode, in which the focusing lens 12 is driven in accordance with the output of the focus detector 20, and the manual focus mode, in which the focusing lens 12 is moved by the manual rotation of the focus operation knob 16 regardless of the output of the focus detector 20.

In the embodiment shown in FIG. 9, the electromagnetic clutch (switching means) 50 is employed to select the autofocus mode or the manual focus mode. The electromagnetic clutch 50 is normally located in the manual focus mode position and is switched to the autofocus mode when the automatic focusing operation is carried out.

FIGS. 10 through 13 show a plan view of an auto-level, a sectional view of peripheral elements of the focus operation knob 16, and sectional views of the electromagnetic clutch 50, respectively.

The rotation of the AF motor 31 is transmitted to the drive shaft 52 of the electromagnetic clutch 50 through the pinion 4 and the reduction gear elements 42, 43 and 44. The rotation of the output shaft 55 of the electromagnetic clutch 50 is transmitted to the shaft 47 of the pinion 12b through the gear elements 45 and 46. Namely, the rotation of the AF motor 31 is transmitted to the pinion shaft 47 and the pinion 12b through: the pinion 4 and the reduction gear elements 42, 43, 44 that constitute the built-in reduction gear 32; the electromagnetic clutch 50 (drive shaft 52 and the output shaft 55); and the gear elements 45, 46. Also, the rotation is transmitted to the rack 12a and the focusing lens 12 through the pinion 12b to move the focusing lens 12 in the optical axis direction.

The structure of the electromagnetic clutch 50 will be discussed below with reference to FIGS. 12 and 13. The drive shaft 52 is rotatably supported by a bearing 53 so as not to move in the thrust direction (axial direction). The bearing 53 is secured to an open end of a cylindrical casing 51. A coil 54 is fitted to the bearing 53 (which serves as a bobbin for the coil) around the drive shaft 52 (which serves as a core for the coil). The casing 51 is provided with an output shaft 55, which is supported to rotate but not to move in the axial direction (thrust direction) by a bearing 56 (which is secured to the other open end of the casing 51).

The output shaft 55 is provided, on the inner end thereof (located in the casing 51), with a shaft portion 55a having a generally D-shaped cross section. An armature 57 is slidably fitted on the D-shaped shaft portion 55a. A spring 58 is positioned between the armature 57 and the inner end of the drive shaft 52, within the casing. The spring 58 continuously biases the armature 57 in the direction away from the inner end of the drive shaft 52. The drive shaft 52 is provided on the inner end thereof with a cylindrical rotor portion 52a. The armature 57 is provided with a cylindrical projection 57a whose end surface is magnetically attracted by the end surface of the rotor portion 52a. The spring 58 is housed between the rotor portion 52a and the cylindrical projection 57a.

Figure 12:
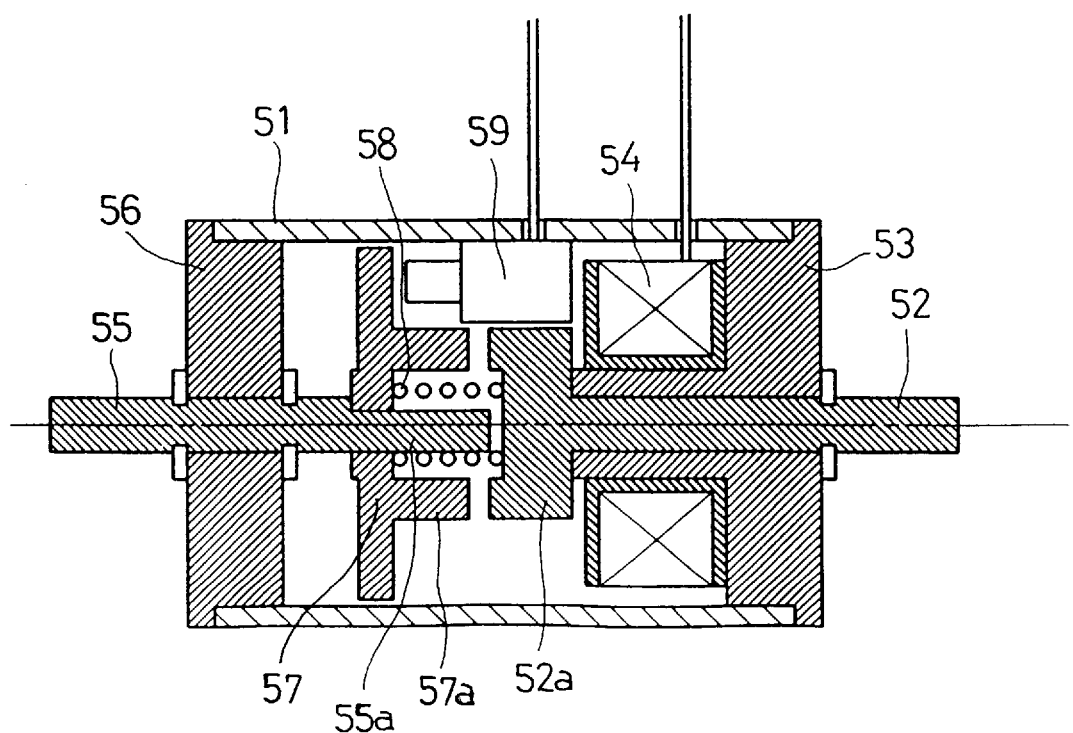
FIG. 12 is a sectional view of main elements of an electromagnetic clutch of a focusing apparatus in a connected position.

When no current flows in the coil 54, the armature 57 is moved away from the drive shaft 52 by the spring 58 (as shown in FIG. 12). Consequently, if drive shaft 52 rotates, no rotation of the output shaft 55 occurs. Conversely, if the output shaft 55 rotates, the drive shaft 52 does not rotate. This state corresponds to the manual focus position.

Figure 13:
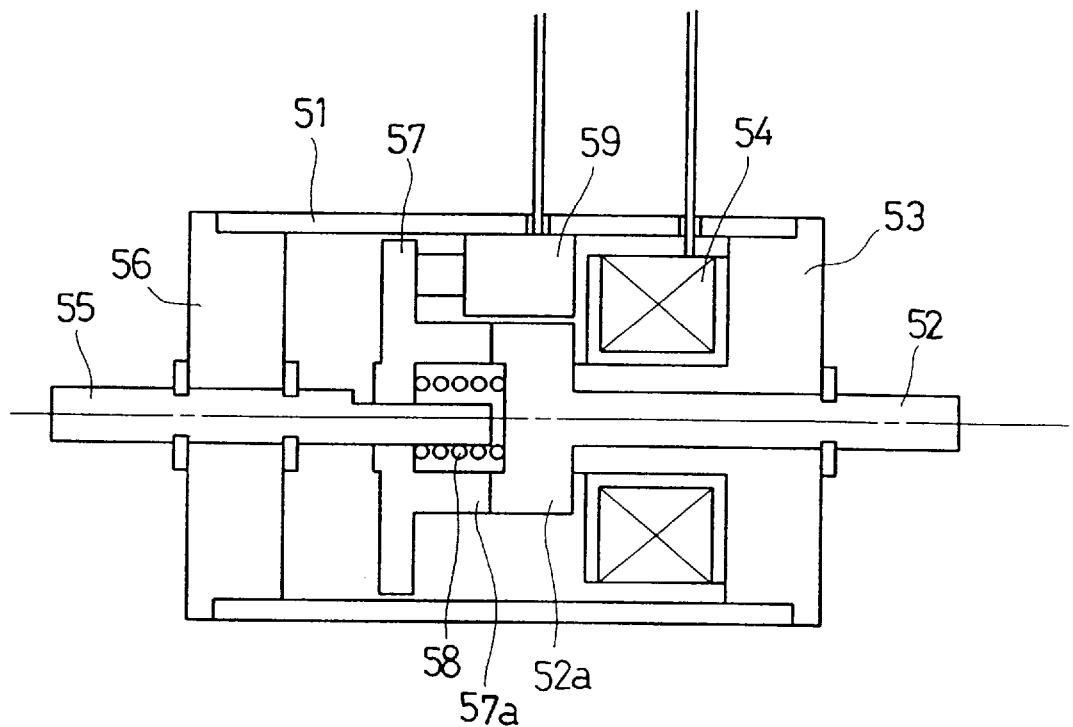
FIG. 13 is a sectional view of main elements of an electromagnetic clutch of a focusing apparatus in a disconnected position; and, FIG. 14 is a flow chart of a start operation in a focusing operation of the auto-level shown in FIG. 9.

When the current flows in the coil 54, the armature 57 is attracted by the end surface of the cylindrical projection 57a, against the biasing force of the spring 58, due to the magnetic force produced at the end surface of the cylindrical projection 57a (as shown in FIG. 13). Consequently, when the drive shaft 52 rotates, the output shaft 55 is rotated through the armature 57 (attracted by the drive shaft 52). In the autofocus mode, the connection of the output shaft 55 and the drive shaft 52 moves the focusing lens 12 by the AF motor 31. The drive shaft 52 and the armature 57 associated therewith constitute a slip friction clutch, which slips when an overload is applied thereto.

When the electric current supplied to the coil 54 is interrupted, the magnetic force disappears. Hence, the armature 57 is moved away from the drive shaft 52 by the spring force of the spring 58 (FIG. 12).

The connection of the armature to the rotor 52a due to the magnetic attraction, i.e., the connection of the electromagnetic clutch 50, is detected by the AF switch 59.

In a modified embodiment, both or either one of the drive shafts 52 and the armature 57 are formed as a permanent magnet. Normally, the spring force of the spring 58 is stronger than the magnetic attraction between the drive shaft 52 and the armature 57, so that the armature 57 is disconnected from the drive shaft 52. When the current in the forward direction is supplied to the coil 54, the magnetic attraction between the armature 57 and the drive shaft 52 is stronger than the spring force of the spring 58, so that the armature 57 is connected to the drive shaft 52 by the magnetic attraction. If the current supply to the coil 54 is interrupted, the attractive connection between the armature 57 and the drive shaft 52 is maintained. When the current in the reverse direction is supplied to the coil 54, the attractive force between the armature 57 and the drive shaft 52 is weaker than the spring force of the spring 58, so that the armature 57 is disconnected from the drive shaft 52 by the spring force of the spring 58. In this embodiment, the period of time in which the current is supplied to the coil 54 can be shortened to reduce the power consumption.

Figure 14:
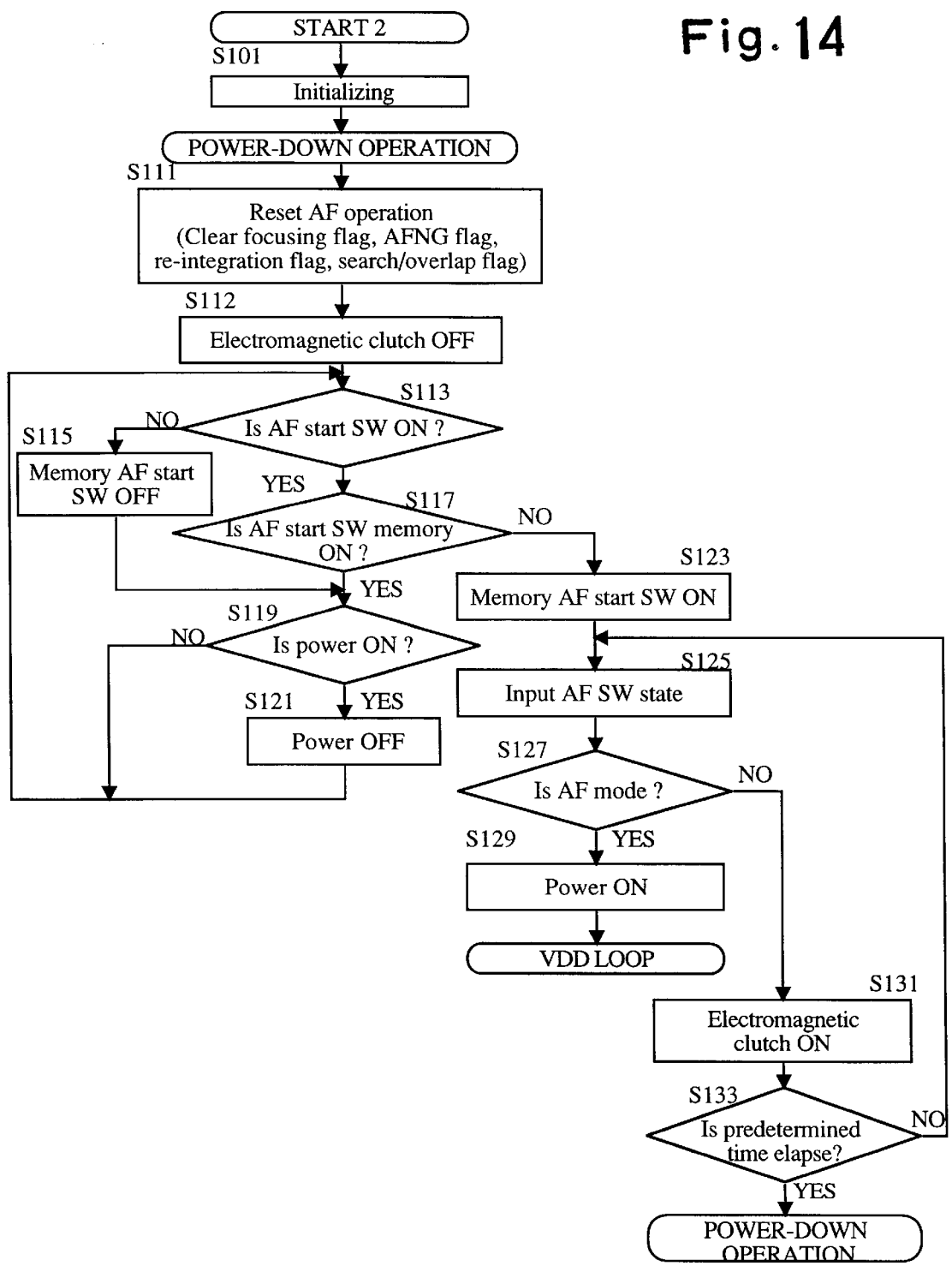

Since the automatic focusing operation in the auto-level 10c is identical to that of the auto-level 10 or 10a shown in FIG. 1 or 8, only main features of the auto-level 10c are shown in FIG. 14.

The auto-level 10c is usually provided with a battery as a power source to drive the electric elements or circuits, etc., as in the auto-level 10 or 10a. The basic automatic focusing operation is the same as that of the auto-level 10 or 10a. The main features of the auto-level 10c only will be discussed below with reference to the flow chart shown in FIG. 14.

A (modified) start operation shown in FIG. 14 is a modification of the first start operation shown in FIG. 2, and the operations corresponding to those in FIG. 2 are designated with like reference numerals.

The control enters the focusing operation when the battery is charged. At step S101, the internal RAM and input/output ports, etc., are initialized and the control enters the power-down operation. Thereafter, no operation at step S101 is performed so long as the battery is not reloaded.

In the power-down operation, a flag for the AF operation (focusing operation) is cleared (set to be zero) to reset the AF operation (step S111).

If the reset operation for the AF operation is completed, the current supplied to the electromagnetic clutch 50 is interrupted (step S112), and whether or not the AF start switch 27 is turned ON is checked (step S113). Since the AF start switch 27 is OFF at the initial position in which no operation by the operator occurs, the AF start switch memory is set to OFF (OFF data is written) at step S115.

Thereafter, whether or not the power source is ON is checked. Since the power source is OFF at the initial position in which no power is supplied to each circuit, the control is returned to step S113 and the operations at steps S113, 115 and 119 are repeated.

The interruption of the power supply to the electromagnetic clutch 50 at step S112 disconnects the AF motor 25 from the focusing lens 12. Namely, in this embodiment, the manual focus mode is normally established, in which the focusing can be controlled by the operation of the manual focus operation knob 16.

If the AF start switch 27 is turned ON, the following operation is performed. The control proceeds to step S117 from S113 to check whether the AF start switch memory is ON. If the AF start switch memory is OFF, (the memory is OFF at the first time), the control proceeds to step S123 to set the AF start switch memory to ON (write ON data) at step S123. Thereafter, whether the AF switch 29 is ON is checked. Normally, the AF start switch 27 is OFF, since the electromagnetic clutch 50 is disconnected (step S125). Therefore, the power is supplied to the electromagnetic clutch 50 and no operation occurs until the AF switch 29 is turned ON (steps S131, S133, S125, S127, S131). As a result of the power supply to the electromagnetic clutch 50, the armature 57 is attracted by and connected to the rotor portion 52a, so that the AF switch 29 is turned ON. If the AF switch 29 is turned ON, the power is supplied to the circuits in order to perform the VDD loop operation (steps S127, S129). If the AF switch 29 is not turned ON within a predetermined time, it is considered that an error occurs, and hence, the control is returned to the power-down operation (step S133).

When the control is returned to the power-down operation, the AF start switch memory is ON. Consequently, if the AF start switch 27 is ON, the control proceeds to step S121 through steps S113, S117, S119 and waits for the operation of the AF start switch. If the AF start switch 27 is OFF, the control proceeds to step S115 from step S113 to set the AF start switch memory to OFF. Thereafter, the control proceeds to step S121 from step S119 to turn the power OFF and waits for the operation of the AF start switch 27.

If the power is turned OFF, the power supply to the electromagnetic clutch 50 is interrupted, and hence, the electromagnetic clutch is disconnected. Namely, if the operator manually rotates the manual focus operation knob 16, the rotation is interrupted by the electromagnetic clutch 50 and is not transmitted to the AF motor 31. Consequently, the operator can manually control the focus without switching the autofocus mode/manual focus mode.

As may be understood from the foregoing, in this embodiment, the electromagnetic clutch 50 is disconnected, and hence, the AF motor 31 is disconnected until the AF start switch 27 is turned ON. Therefore, the operator can manually control the focusing operation by rotating the manual focus operation knob 16. If the AF start switch 27 is turned ON, the electromagnetic clutch 50 is turned ON to connect the AF motor 31 so as to perform the automatic focusing operation. If it is detected that the focused state is obtained or no focusing can be effected, the electromagnetic clutch 50 is turned OFF to disconnect the AF motor 31. Thus, no automatic focusing operation is carried out, the manual focus control or the autofocus control can be effected without switching the mode between the manual focus mode and the autofocus mode.

Although the above mentioned-embodiment is applied to an auto-level, the present invention can be equally applied to other surveying instruments, such as a transit or a total station, or a telescopic optical system such as a telescope or a binocular telescope, etc.

As may be understood from the foregoing, according to the present invention, in a telephotographic system having an automatic focusing apparatus, once an external operation means is actuated, the focusing operation continues until the same is completed, and hence, the operator can concentrate upon operations, such as an observation through the telephotographic system, other than the focusing operation.

In the present invention, the motor drive means is connected to the focusing lens moving means only when the automatic focusing operation is carried out, and the focusing lens moving means is disconnected from the motor drive means when no automatic focusing operation is effected. Hence, in the normal position, the lens moving means is manually driven and the automatic focusing operation can be effected by actuating the control means in accordance with need, without switching the focus modes. Thus, the operability of the focus control can be enhanced.

What is claimed is:

1. An automatic focusing apparatus for a telephotographic system, comprising:
    a telephotographic system that moves a focusing lens along an optical axis to control focus;
    a focus detecting device that detects a focus state through said telephotographic system;
    a lens moving device that moves said focusing lens;
    a control device that drives said lens moving device in accordance with said focus state detected by said focus detecting device, moving said focusing lens to thereby control said focus; and
    an external operation initiator that actuates said control device to perform a focusing operation when said external operation initiator is operated,
    wherein when said external operation initiator actuates said control device, said control device continues to perform said focusing operation until said focusing operation is completed.

2. An automatic focusing apparatus according to claim 1, wherein said focus detecting device detects a defocus state with respect to a predetermined focal plane of said telephotographic system.

3. An automatic focusing apparatus according to claim 2, wherein said control device performs a search operation in which when no effective defocus can be detected by said focus detecting device, defocus is detected while moving said focusing lens in an entire displacement range thereof, and when an effective defocus is detected, said focusing lens is moved to a focal position in which said focused state is obtained and detected.

4. An automatic focusing apparatus according to claim 2, wherein said control device performs a search operation in which when no effective defocus can be detected by said focus detecting device, defocus is detected while moving said focusing lens in an entire displacement range thereof, and when no effective defocus is still detected even after said movement of said focusing lens in said entire displacement range, said focusing operation is stopped.

5. An automatic focusing apparatus according to claim 4, wherein once said focusing operation begins when said external operation initiator is operated, said control device continues said focusing operation regardless of a subsequent operation of said external operation initiator until said focused state is detected by said focus detecting device when said effective defocus is detected by said focus detecting device, or until said search operation is completed when no effective defocus can be detected by said focus detecting device.

6. An automatic focusing apparatus according to claim 1, wherein said external operation initiator comprises a switch, so that said control device commences said focusing operation when said switch is turned ON, and wherein said focusing operation continues even when said switch is turned OFF.

7. An automatic focusing apparatus according to claim 1, wherein said external operation initiator comprises a switch, so that said control device commences said focusing operation and stops said focusing operation that has been carried out every time said switch is turned ON from OFF.

8. An automatic focusing apparatus according to claim 1, further comprising a mode selection device for selecting a first mode in which said control device commences said focusing operation when said external operation initiator is operated and said focusing operation continues if said external operation initiator is turned OFF, or a second mode in which said control device performs said focusing operation that has been not effected or stops said focusing operation that has been carried out every time said external operation initiator is operated.

9. An automatic focusing apparatus according to claim 1, further comprising:
    a manual drive device that drives said lens moving device by an external operation force;
    a motor drive device that drives said lens moving device; and
    a clutch device that selectively connects said motor drive device and said lens moving device,
    wherein said control device normally disconnects said clutch device, connects said clutch device when an automatic focusing operation is carried out, and disconnects said clutch device when said automatic focusing operation is completed.

10. An automatic focusing apparatus according to claim 9, wherein said control device disconnects said clutch device when said focusing lens is moved to a focal position, and disconnects said clutch device when said focusing lens cannot be moved to said focal position after said focusing lens is moved to a predetermined position.

11. An automatic focusing apparatus according to claim 10, wherein said predetermined position of said focusing lens is determined with respect to a reference position located at a displacement extremity of said focusing lens, and wherein said predetermined position is detected in accordance with an amount of drive of said lens moving device driven by said motor drive device.

12. An automatic focusing apparatus according to claim 10, wherein said predetermined position of said focusing lens is located at a hyperfocal distance position of said telephotographic system.

13. An automatic focusing apparatus according to claim 10, wherein said predetermined position of said focusing lens is a focal position for an object located at a distance of about 10 m.

14. An automatic focusing apparatus according to claim 1, incorporated in a surveying instrument.

15. An automatic focusing apparatus for a telephotographic system, comprising:
    a telephotographic system that moves a focusing lens along an optical axis to control focus;
    a focus detecting device that detects a focus state through said telephotographic system;
    a lens moving device that moves said focusing lens;
    a control device that drives said lens moving device in accordance with said focus state detected by said focus detecting device, moving said focusing lens to thereby control said focus;

an external operation initiator that actuates said control device to perform a focusing operation when said external operation initiator is operated; and an electrical power source, wherein when said external operation initiator actuates said control device, said control device supplies power to said focus detecting device and said lens moving device from said power source to perform said focusing operation, and when said focusing operation ends, said control device stops said power.

16. An automatic focusing apparatus according to claim 15, wherein said external operation initiator comprises a switch, and wherein said control device supplies said electrical power and performs said focusing operation when said switch is turned ON, and stops said power supply when said focusing operation is completed even if said switch is maintained in said ON state.

17. An automatic focusing apparatus according to claim 15, wherein said power source is a primary or a secondary battery.

18. An automatic focusing apparatus according to claim 15, wherein said focus detecting device comprises a defocus detecting device for detecting a defocus state with respect to a predetermined focal plane of said telephotographic system, and wherein when no effective defocus can be detected by said focus detecting device, said defocus state is detected while moving said focusing lens in an entire displacement range thereof, and when an effective defocus is detected, said focusing lens is moved to a focal position in which said focus state is obtained and detected so that said focusing operation ends, wherein said control device stops said focusing operation when no effective defocus can be still detected even by said movement of said focusing lens in said entire displacement range and stops thereafter said power supply.

19. An automatic focusing apparatus according to claim 15, further comprising:

a manual drive device that drives said lens moving device by an external operation force;

a motor drive device that drives said lens moving device; and a clutch device that selectively connects said motor drive device and said lens moving device, wherein said control device normally disconnects said clutch device, connects said clutch device when said focusing operation is carried out, and disconnects said clutch device when said power supply is stopped.

20. An automatic focusing apparatus for a telephotographic system, comprising:

a telephotographic system that moves a focusing lens along an optical axis to control focus;

a focus detecting device that detects a focus state through said telephotographic system;

a lens moving device that moves said focusing lens;

a motor drive device that drives said lens moving device;

a clutch device that selectively connects said motor drive device and said lens moving device; and a control device that drives said focus detecting device and said motor drive device to control said focus operation, wherein when an automatic focusing operation is carried out, said control device connects said clutch device, and when said automatic focusing operation is not carried out, said control device disconnects said clutch device.

21. An automatic focusing apparatus according to claim 20, further comprising a manual drive device for driving said lens moving device by an external operation force, wherein said control device disconnects said clutch device so as not to transmit said external operation force of said manual drive device to said motor drive device when said automatic focusing operation is not carried out.

22. An automatic focusing apparatus according to claim 20, further comprising an automatic focus start operation device, and wherein said control device connects said clutch device to perform said automatic focusing operation when said automatic focus start operation device is actuated.

23. An automatic focusing apparatus according to claim 20, further comprising a manual drive device for driving said lens moving device by an external operation force, wherein said clutch device selectively connects one of said motor drive device and said manual drive device to said lens moving device and disconnects the remaining one of said motor drive device and said manual drive device from said lens moving device.

24. An automatic focusing apparatus according to claim 23, wherein said clutch device is an electromagnetic clutch device that connects said manual drive device to said lens moving device when no electric current is supplied thereto and which connects said motor drive device to said lens moving device when said electric current is supplied.

25. An automatic focusing apparatus according to claim 20, wherein said clutch device is an electromagnetic clutch device which is disconnected when no electric current is supplied thereto and which is connected when said electric current is supplied.

26. An automatic focusing apparatus according to claim 20, wherein said clutch device is an electromagnetic clutch device which comprises two shafts that can be connected to each other and disconnected from one another; an armature slidably mounted to one of said two shafts; a rotor secured to the remaining one of said two shafts and magnetically attracted to said armature; an electromagnetic coil provided on said rotor; and a resilient member that biases said armature away from said rotor, said armature being attracted by said rotor to connect said two shafts when said coil is supplied with electric current, and said armature being moved away from said rotor by said biasing force of said resilient member to disconnect said two shafts when no electric current is supplied to said coil.

27. An automatic focusing apparatus according to claim 20, wherein said clutch device is an electromagnetic clutch device which comprises two shafts that can be connected to each other and disconnected from one another; an armature slidably mounted to one of said two shafts; a rotor which is secured to a remaining one of said two shafts and which can be magnetically attracted to said armature; a coil provided about said rotor which serves as a core; and a resilient member which continuously biases said armature away from said rotor, one of said armature and said rotor being made of a permanent magnet, so that said armature is attracted by said rotor when said coil is supplied with electric current in a predetermined direction, said magnetic attraction being maintained in a magnetic attraction state if said power supply to said coil is interrupted, said armature being moved away from said rotor when said coil is supplied with electric current in a direction opposite to said predetermined direction in said magnetic attraction state, and a disconnection of said shafts being maintained if said power supply to said coil is interrupted.

28. An automatic focusing apparatus according to claim 20, wherein said control device disconnects said clutch device after said focus lens is moved to a focal position by said automatic focusing operation and when said control device detects that said focusing is impossible.

29. An automatic focusing apparatus for a telephotographic system, comprising:

a telephotographic system that moves a focusing lens to a focal position along an optical axis to control focus;

a focus detecting device that detects a focus state through said telephotographic system;

a lens moving device that moves said focusing lens;

a manual drive apparatus that drives said lens moving device by an external operation force;

a motor drive device that drives said lens moving device;

a clutch device that selectively connects said motor drive device and said lens moving device; and a control device that drives said focus detecting device and said motor drive device in a focus operation, wherein said control device normally disconnects said clutch device and connects said clutch device when said focusing operation is carried out, said control device being adapted to disconnect said clutch device when said focusing lens is moved to said focal position, said control device being adapted to disconnect said clutch device after said focusing lens is moved to a predetermined position when said focusing lens cannot be moved to said focal position.

30. An automatic focusing apparatus according to claim 29, wherein said predetermined position of said focusing lens is determined with respect to a reference position located at a displacement extremity of said focusing lens and is detected in accordance with an amount of drive of said lens moving device driven by said motor drive device.

31. An automatic focusing apparatus for a telephotographic system, comprising:

a telephotographic system that moves a focusing lens along an optical axis to control focus;

a focus detecting device that detects a focus state through said telephotographic system;

lens moving means that moves said focusing lens;

control means that drives said lens moving means in accordance with said focus state detected by said focus detecting device, moving said focusing lens to thereby control said focus; and external operation means for actuating said control means to perform a focusing operation when said external operation means is operated, wherein when said external operation means actuates said control means, said control means continues to perform said focusing operation until said focusing operation is completed.

32. An automatic focusing apparatus for a telephotographic system, comprising:

a telephotographic system that moves a focusing lens along an optical axis to control focus;

focus detecting means for detecting a focus state through said telephotographic system;

lens moving means for moving said focusing lens;

control means for driving said lens moving means in accordance with said focus state detected by said focus detecting means, moving said focusing lens to thereby control said focus;

external operation means for actuating said control means to perform a focusing operation when said external operation means is operated; and an electrical power source, wherein said control means supplies power to said focus detecting means and said lens moving means from said power source to perform said focusing operation when said external operation means actuates said control means, and stops said power supply when said focusing operation ends.

33. An automatic focusing apparatus for a telephotographic system, comprising:

a telephotographic system that moves a focusing lens along an optical axis to control a focus operation;

focus detecting means for detecting a focus state through said telephotographic system;

lens moving means for moving said focusing lens;

motor drive means for driving said lens moving means;

clutch means for selectively connecting said motor drive means and said lens moving means; and control means for driving said focus detecting means and said motor drive means to control said focus operation, wherein said control means connects said clutch means when an automatic focusing operation is carried out and disconnects said clutch means when said automatic focusing operation is not effected.

34. An automatic focusing apparatus for a telephotographic system, comprising:

a telephotographic system that moves a focusing lens to a focal position along an optical axis to control a focus operation;

focus detecting means for detecting a focus state through said telephotographic system;

lens moving means for moving said focusing lens;

manual drive means for driving said lens moving means by an external operation force;

motor drive means for driving said lens moving means;

clutch means for selectively connecting said motor drive means and said lens moving means; and control means for driving said focus detecting means and said motor drive means to control said focus operation, wherein said control means normally disconnects said clutch means and connects said clutch means when an automatic focusing operation is carried out, said control means disconnecting said clutch means when said focusing lens is moved to said focal position, said control means disconnecting said clutch means after said focusing lens is moved to a predetermined position when said focusing lens cannot be moved to said focal position.

* * * * *